United States Patent
Singh et al.

(10) Patent No.: US 12,521,394 B2
(45) Date of Patent: Jan. 13, 2026

(54) THERAPEUTIC COMPOSITIONS AND METHODS FOR TREATING CANCERS

(71) Applicant: Pattern Computer, Inc., Friday Harbor, WA (US)

(72) Inventors: Nidhi Singh, Friday Harbor, WA (US); Meenakshi Venkatasubranian, Friday Harbor, WA (US); Quinn Jackson, Friday Harbor, WA (US)

(73) Assignee: Pattern Computer, Inc., Friday Harbor, WA (US)

( * ) Notice: Subject to any disclaimer, the term of this patent is extended or adjusted under 35 U.S.C. 154(b) by 923 days.

(21) Appl. No.: 17/621,555

(22) PCT Filed: Jun. 19, 2020

(86) PCT No.: PCT/US2020/038684
§ 371 (c)(1),
(2) Date: Dec. 21, 2021

(87) PCT Pub. No.: WO2020/257615
PCT Pub. Date: Dec. 24, 2020

(65) Prior Publication Data
US 2022/0354874 A1    Nov. 10, 2022

Related U.S. Application Data

(60) Provisional application No. 63/031,749, filed on May 29, 2020, provisional application No. 62/864,870, filed on Jun. 21, 2019.

(51) Int. Cl.
*A61K 31/519* (2006.01)
*A61K 31/506* (2006.01)
(Continued)

(52) U.S. Cl.
CPC .......... *A61K 31/519* (2013.01); *A61K 31/506* (2013.01); *A61K 31/52* (2013.01); *A61P 35/00* (2018.01)

(58) Field of Classification Search
None
See application file for complete search history.

(56) References Cited

U.S. PATENT DOCUMENTS

2015/0099744 A1    4/2015   Tamang et al.
2016/0346282 A1   12/2016   Pachter et al.
(Continued)

FOREIGN PATENT DOCUMENTS

CN       109562172 A      4/2019
WO    WO-2011133668 A2 * 10/2011    ......... A61K 31/4741
(Continued)

OTHER PUBLICATIONS

Defactinib (CAS 1073154-85-4) PubChem Compound Summary File, National Center for Biotechnology Information. Accessed Mar. 18, 2025 from PubChem, entered into PubChem Jan. 1, 2009 (Year: 2009).*

(Continued)

*Primary Examiner* — Kortney L. Klinkel
*Assistant Examiner* — Sophia Reilly
(74) *Attorney, Agent, or Firm* — Barry L. Davison; Davis Wright Tremaine LLP

(57) ABSTRACT

The present disclosure provides therapeutic combinations, which provide a synergistic effect in treating a cancer. The present disclosure provides methods of treatment including administration of the combinations, and uses of the combinations, e.g., for treatment of cancer.

8 Claims, 35 Drawing Sheets

(51) Int. Cl.
*A61K 31/52* (2006.01)
*A61P 35/00* (2006.01)

(56) References Cited

U.S. PATENT DOCUMENTS

2017/0333440 A1 11/2017 Strum et al.
2018/0036289 A1 2/2018 Gonzalez Buenrostro et al.
2018/0141939 A1 5/2018 Lapina et al.
2018/0250302 A1 9/2018 Caponigro et al.

FOREIGN PATENT DOCUMENTS

| WO | 2016130546 A1 | 8/2016 |
| WO | 2016210108 A1 | 12/2016 |
| WO | 2017201043 A1 | 11/2017 |
| WO | WO 2018/122168 A1 | 7/2018 |

OTHER PUBLICATIONS

Idelalisib (CAS 870281-82-6) PubChem Compound Summary File, National Center for Biotechnology Information. Accessed Mar. 18, 2025 from PubChem, entered into PubChem Oct. 26, 2006 (Year: 2006).*

Lehmann et. al., "PIK3CA mutations in androgen receptor-positive triple negative breast cancer confer sensitivity to the combination of PI3K and androgen receptor inhibitors" Breast Cancer Research, 2014, 16, 406, 1-14. DOI: 10.1186/s13058-014-0406-x (Year: 2014).*

Xu et. al. "Abstract 3908: Focal adhesion kinase (FAK) inhibitor VS-6063 (defactinib) preferentially targets cancer stem cells in triple negative breast cancer" Proceedings: AACR Annual Meeting 2014; Apr. 5-9, 2014; San Diego, CA Online ISSN: 1538-7445 DOI: 10.1158/1538-7445.AM2014-3908 (Year: 2014).*

Canadian Patent Office First Office Action dated Mar. 6, 2024, Application No. 3,144,639, 5 pages.

Chen, et al., "Research Progress on New Anti-tumor Target Focal Adhesion Kinase FAK and its Inhibitors," Chinese Journal of Modern Applied Pharmacy vol. 33 No. 2, Feb. 2016, 6 pages.

Chile Ministry of Economy Notification of Search Report dated Oct. 2, 2024, Application No. 2023-03090, 10 pages.

China State Intellectual Property Office Notice of Registration Procedure, Notice of Grant, and Search Report dated Aug. 23, 2024, 4 pages.

European Patent Office Extended Search Report dated Aug. 16, 2023, Application No. 20826905.0, 12 pages.

Mexican Secretary of Economy Patent Division First Office Action dated Aug. 16, 2024, Application No. MX/a/2022/000082, 7 pages.

Divisional Patents Directorate, "Second Office Action" in Application No. MX/a2022/000082, dated Jan. 28, 2025, 14 pages.

Australian Patent Office, "Examination No. 1" in application No. 2020297587, Mar. 4, 2025, 5 pages.

Anonymous, "General Cell Collection Detail, ECACC General Cell Collection: HMT-3522 T4-2, European Collection of Authenticated Cell Cultures (ECACC), Cell Line Name: Epithelial-like Growth Mode", pp. 1-4 (2023).

Chen et al., "Tetrandrine and arsenic trioxide synergistically inhibit proliferation of HCC1937 triple negative breach cancer cells", *Journal of Traditional Chinese Medicine* 37(4):436-443 (2017).

International Search Report and Written Opinion for International Application No. PCT/US2020/038684, mailed Sep. 28, 2020, 10 pages.

Marlowe et al., "Oncogenic Receptor Tyrosine Kinases Directly Phosphorylate Focal Adhesion Kinase (FAK) as a Resistance Mechanism to FAK-Kinase Inhibitors", Molecular Cancer Therapeutics 15(12):3028-3039 (2016).

Supplementary Partial European Search Report for PCT/US2020/038684 mailed May 12, 2023, 12 pages.

* cited by examiner

A
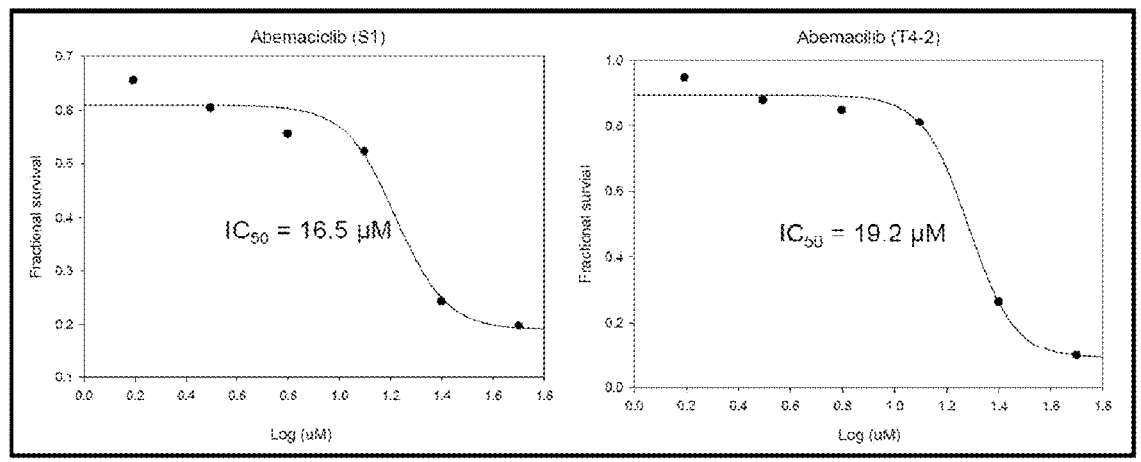
B
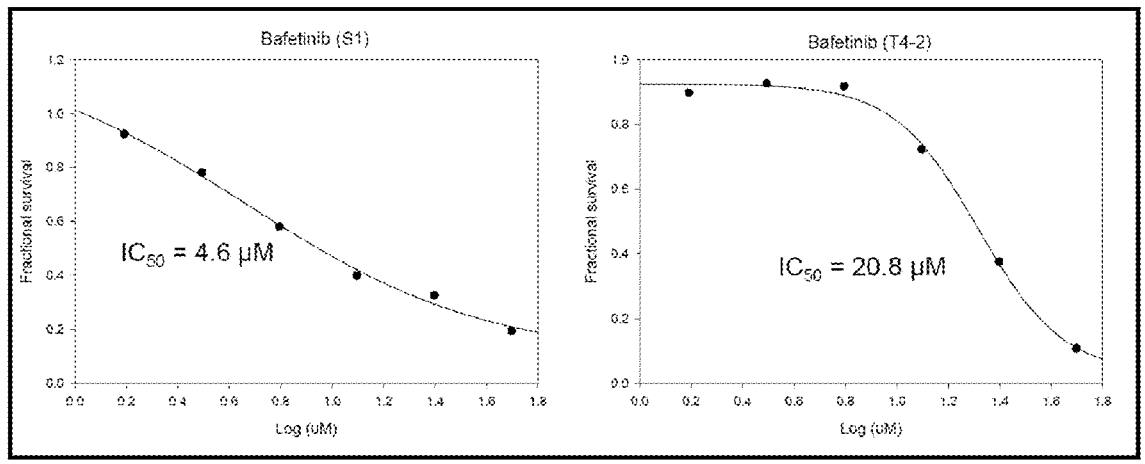
Fig. 3

C
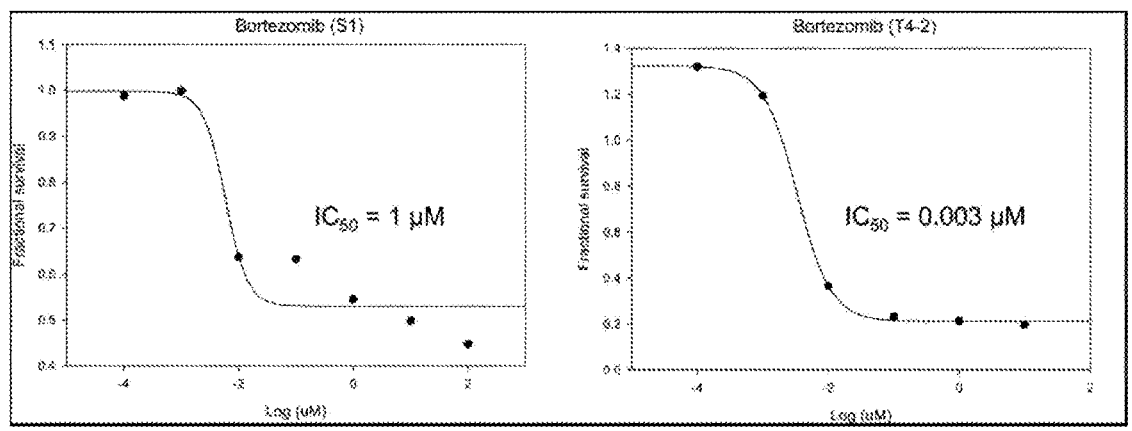
D
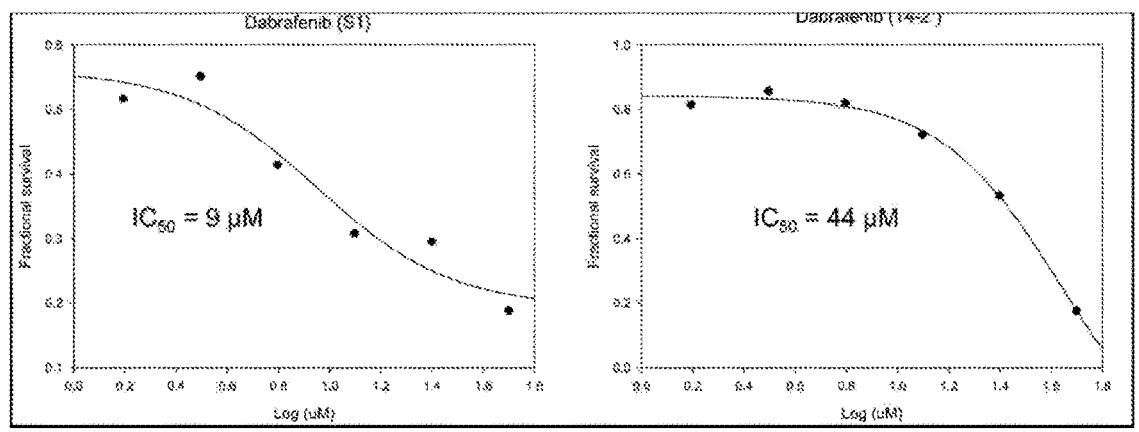
Fig. 3 (continued)

E
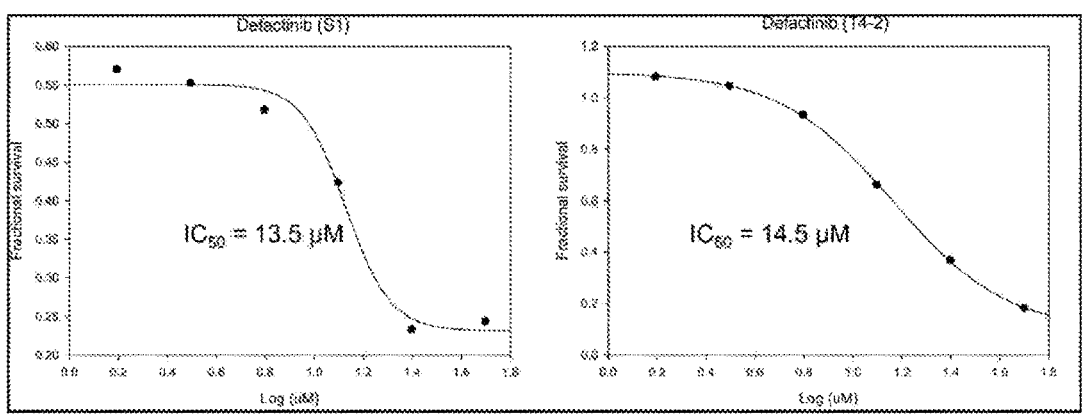
F
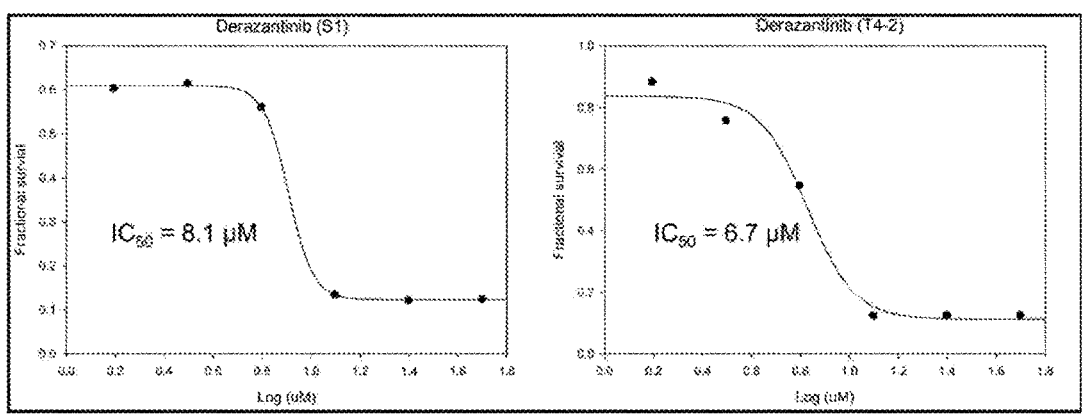
Fig. 3 (continued)

G
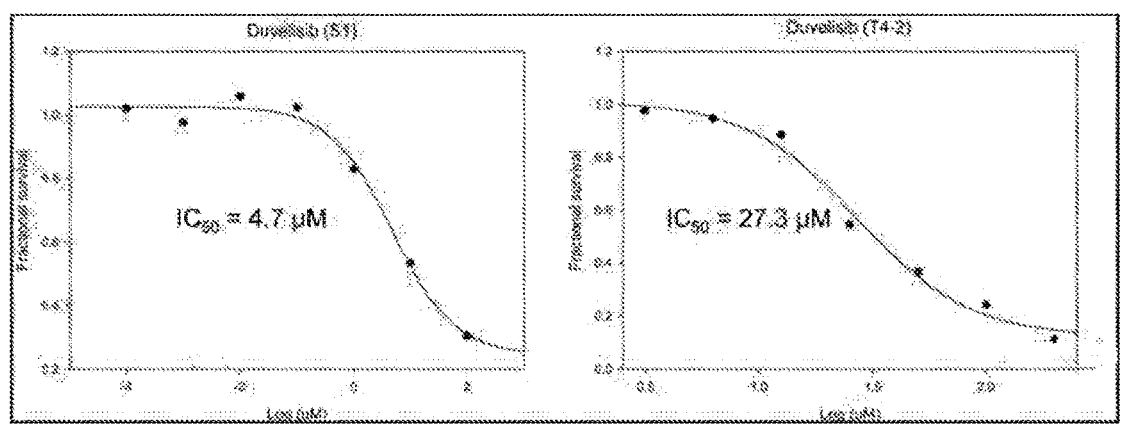
H
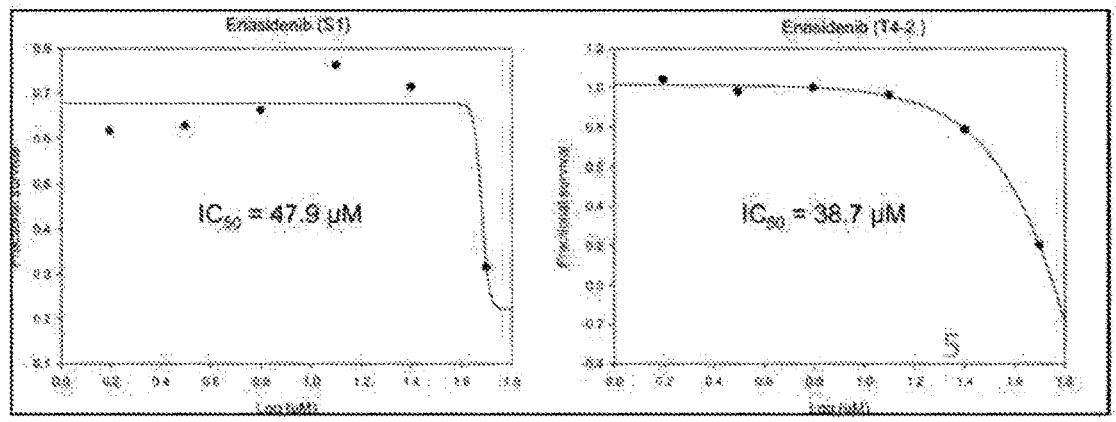
Fig. 3 (continued)

K
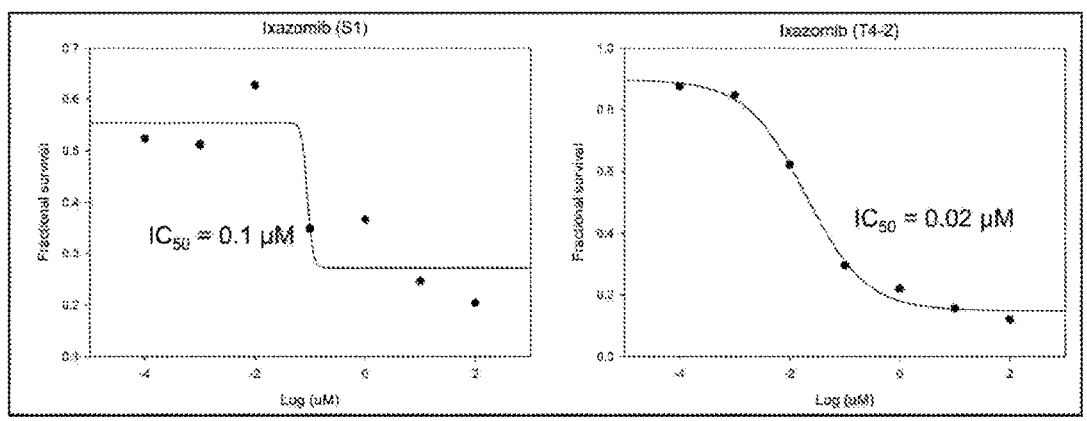
L
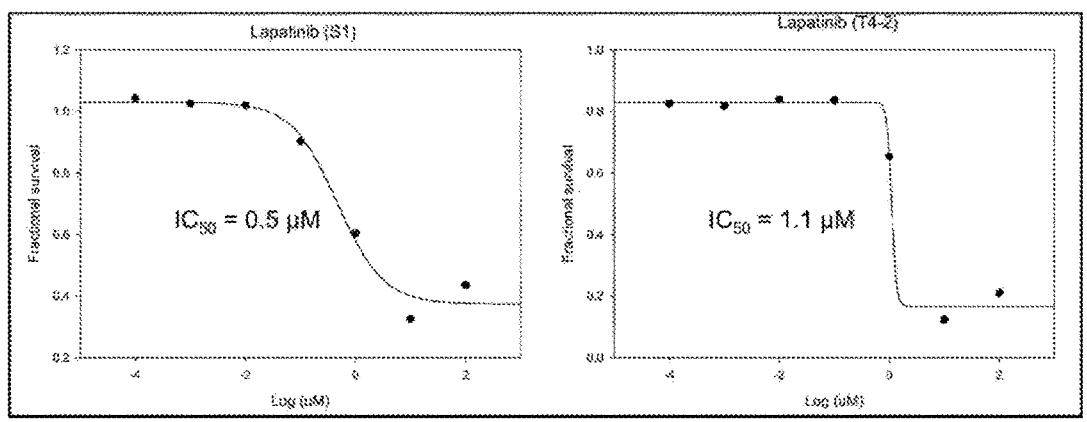
Fig. 3 (continued)

M
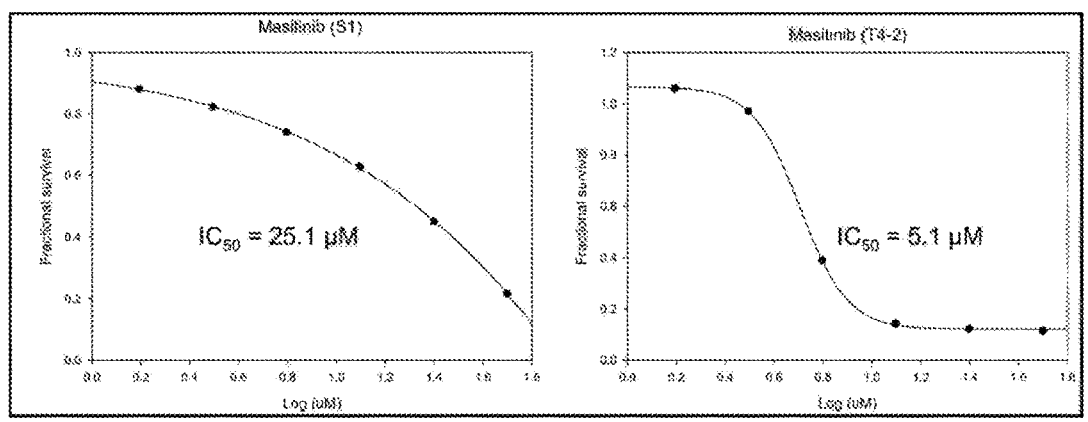
N
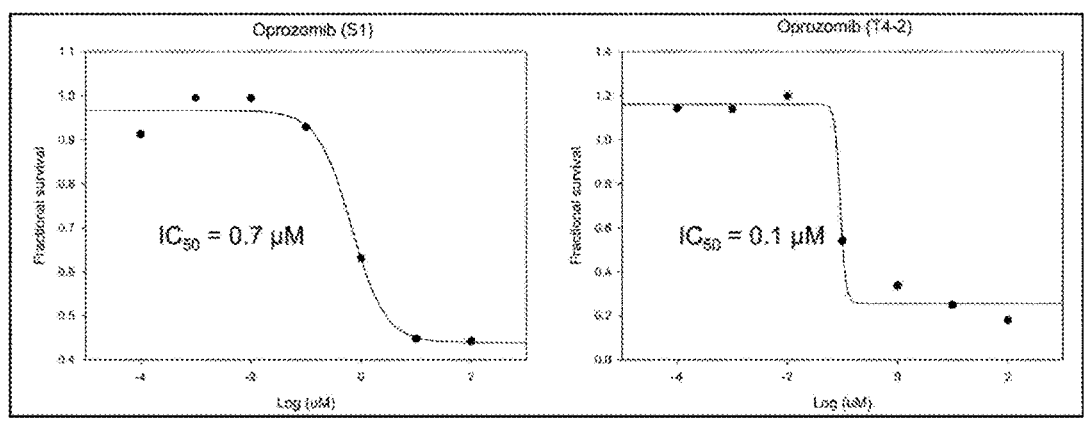
Fig. 3 (continued)

O

Drug-Response Assay Determines IC$_{50}$

| | Compound | ABB | S1_IC50 (µM) | T4_IC50 (µM) |
|---|---|---|---|---|
| 1 | Abemaciclib | AbE | 16.54 | 19.2 |
| 2 | Acalabrutinib | AcA | ND | ND |
| 3 | Bafetinib | BaF | 4.62 | 20.75 |
| 4 | Bortezomib | BoR | 1 | 0.003 |
| 5 | Dabrafenib | DaB | 9.01 | 44 |
| 6 | Defactinib | DeF | 13.45 | 14.5 |
| 7 | Derazantinib | DeR | 8.07 | 6.73 |
| 8 | Duvelisib | DuV | 4.73 | 27.26 |
| 9 | Enasidenib | EnA | 47.85 | 38.72 |
| 10 | Entospletinib | EnT | ND | ND |
| 11 | Erismodegib | ErI | 57.04 | 27.54 |
| 12 | Fostamatinib | FoS | 3.09 | 15.8 |
| 13 | Idelalisib | IdE | ND | ND |
| 14 | Ixazomib | IxA | 0.09 | 0.02 |
| 15 | Lapatinib | LaP | 0.47 | 1.1 |
| 16 | Larotrectinib sulfate | LaR | ND | ND |
| 17 | Mastinib | MaS | 25.12 | 5.09 |
| 18 | Niraparib | NiR | ND | ND |
| 19 | Oprozomib | OpR | 0.67 | 0.092 |
| 20 | Ribociclib | RiB | ND | 32 |
| 21 | Roblitinib | RoB | ND | ND |

*ND: Not Determined*

Fig. 4

| Phenotype | Non-malignant cells | | | Malignant cells | | |
|---|---|---|---|---|---|---|
| Effect | No significant side effect | Cell proliferation | Cell death | No therapeutic effect | Growth Arrest | Cell death |
| Inhibitors | Bortezomib, Lapatinib, Bortezomib+Lapatinib, Bortezomib+Enasidenib, Abemaciclib, Bortezomib+Abemaciclib, Ixazomib, Entospletinib, Mastinib, Robitinib, Larotrectinib, Mastinib+Larotrectinib, Idelalisib, Defactinib, Idelalisib+Entospletinib, Enasidenib+Lapatinib, Acalabrutinib, Dabrafenib, Ribociclib, Ribociclib+Dabrafenib, Derazantinib | Oprozomib | Niraparib, Niraparib+Ixazomib, Oprozomib, Oprozomib+Robitinib, Idelalisib+Defactinib, Bafetinib, Duvelisib, Derazantinib+Dabrafenib | Bortezomib+Derazantinib, Enasidenib+Lapatinib | Abemaciclib, Bafetinib, Defactinib | Abemaciclib+Bortezomib, Enasidenib, Niraparib, Oprozomib, Mastinib, Mastinib+Larotrectinib, Sonidegib, Mastinib+Sonidegib, Dabrafenib, Ribociclib+Dabrafenib, Derazantinib+Dabrafenib |

| | 0 | 1.56 | 3.125 | 6.25 | 12.5 | 25 | 50 | 100 | EnT (uM) |
|---|---|---|---|---|---|---|---|---|---|
| 0 | | | | | | | | | |
| 1.56 | 0.818 | | | | | | | | |
| 3.125 | | | | | | | | | |
| 6.25 | | | | | | | | | |
| 12.5 | 0.531 | | | 0.602 | 0.654 | | | 0.664 | |
| 25 | 0.336 | 0.642 | 0.443 | 0.583 | 0.621 | 0.505 | 0.621 | 0.450 | |
| 50 | 0.275 | 0.280 | 0.280 | 0.296 | 0.280 | 0.296 | 0.287 | 0.296 | |
| 100 | 0.275 | 0.280 | 0.268 | 0.282 | 0.277 | 0.284 | 0.291 | 0.289 | |
| DaF (uM) | | | | | | | | | |

B

| | 0 | 3.125 | 6.25 | 12.5 | 25 | 50 | EnA (uM) |
|---|---|---|---|---|---|---|---|
| 0 | 1.000 | | | | 0.702 | 0.195 | |
| 1.56 | 0.596 | 0.243 | 0.372 | 0.274 | 0.272 | 0.123 | |
| 3.125 | 0.504 | 0.334 | 0.141 | 0.190 | 0.161 | 0.130 | |
| 6.25 | 0.155 | 0.136 | 0.140 | 0.146 | 0.140 | 0.138 | |
| 12.5 | 0.132 | 0.141 | 0.140 | 0.148 | 0.163 | 0.149 | |
| 25 | 0.129 | 0.142 | 0.140 | 0.135 | 0.139 | 0.162 | |
| LaP (uM) | | | | | | | |

| | 0 | 0.001 | 0.002 | 0.004 | 0.008 | 0.16 | 0.32 | 0.64 | BoR(uM) |
|---|---|---|---|---|---|---|---|---|---|
| 0 | | 0.360 | 0.274 | 0.214 | 0.191 | 0.178 | 0.149 | 0.142 | |
| 1.56 | | | 0.324 | 0.255 | 0.212 | 0.210 | 0.178 | 0.153 | 0.140 |
| 3.125 | | | 0.390 | 0.298 | 0.249 | 0.206 | 0.191 | 0.156 | 0.142 |
| 6.25 | | | 0.501 | 0.298 | 0.198 | 0.189 | 0.170 | 0.152 | 0.136 |
| 12.5 | | | 0.123 | 0.127 | 0.136 | 0.124 | 0.143 | 0.141 | 0.132 |
| 25 | 0.110 | 0.110 | 0.112 | 0.110 | 0.113 | 0.111 | 0.110 | 0.115 | |
| 50 | 0.113 | 0.112 | 0.118 | 0.110 | 0.116 | 0.113 | 0.110 | 0.111 | |
| 100 | 0.124 | 0.107 | 0.110 | 0.110 | 0.107 | 0.110 | 0.106 | 0.112 | |
| DeR (uM) | | | | | | | | | |

D

| | 0 | 3.125 | 6.25 | 12.5 | 25 | 50 | EnA (uM) |
|---|---|---|---|---|---|---|---|
| 0 | | | | | | 0.262 | |
| 0.00625 | 0.316 | 0.340 | 0.380 | 0.380 | 0.254 | 0.119 | |
| 0.0125 | 0.234 | 0.284 | 0.307 | 0.302 | 0.167 | 0.124 | |
| 0.025 | 0.197 | 0.226 | 0.234 | 0.216 | 0.152 | 0.125 | |
| 0.05 | 0.170 | 0.193 | 0.184 | 0.180 | 0.156 | 0.122 | |
| 0.1 | 0.155 | 0.156 | 0.157 | 0.149 | 0.138 | 0.121 | |
| BoR (uM) | | | | | | | |

| RaB (uM) \ OpR (uM) | 0 | 0.064 | 0.128 | 0.256 | 0.512 | 1.024 | 2.048 |
|---|---|---|---|---|---|---|---|
| 0 | 1.000 | 0.584 | 0.368 | 0.384 | 0.292 | 0.274 | 0.201 |
| 3.125 | 1.125 | 0.531 | 0.529 | 0.424 | 0.361 | 0.337 | 0.220 |
| 6.25 | 1.125 | 0.503 | 0.473 | 0.404 | 0.432 | 0.320 | 0.203 |
| 12.5 | 1.109 | 0.578 | 0.516 | 0.375 | 0.371 | 0.261 | 0.204 |
| 25 | 1.109 | 0.583 | 0.496 | 0.403 | 0.266 | 0.251 | 0.178 |
| 50 | 1.116 | 0.559 | 0.424 | 0.403 | 0.214 | 0.164 | 0.155 |
| 100 | 0.511 | 0.334 | 0.278 | 0.168 | 0.150 | 0.157 | 0.156 |

F

| BoR (uM) \ AbE (uM) | 0 | 3.125 | 6.25 | 12.5 | 25 | 50 |
|---|---|---|---|---|---|---|
| 0 | 1.000 | 1.066 | 1.107 | 0.717 | 0.112 | 0.104 |
| 0.00625 | 0.368 | 0.479 | 0.448 | 0.382 | 0.107 | 0.100 |
| 0.0125 | 0.286 | 0.318 | 0.288 | 0.201 | 0.108 | 0.101 |
| 0.025 | 0.209 | 0.185 | 0.194 | 0.138 | 0.106 | 0.101 |
| 0.05 | 0.190 | 0.177 | 0.170 | 0.144 | 0.110 | 0.102 |
| 0.1 | 0.154 | 0.144 | 0.135 | 0.120 | 0.111 | 0.105 |

| | 0 | 1.56 | 3.125 | 6.25 | 12.5 | 25 | MaS (uM) |
|---|---|---|---|---|---|---|---|
| 0 | 1.000 | 0.987 | 0.895 | 0.825 | 0.342 | 0.161 | |
| 6.25 | 1.086 | 0.942 | 1.076 | 0.965 | 0.348 | 0.120 | |
| 12.5 | 1.047 | 1.135 | 1.064 | 0.890 | 0.347 | 0.124 | |
| 25 | 0.999 | 1.157 | 1.099 | 0.829 | 0.322 | 0.126 | |
| 50 | 1.091 | 1.078 | 1.065 | 1.004 | 0.330 | 0.126 | |
| 100 | 0.738 | 0.723 | 0.749 | 0.638 | 0.509 | 0.200 | |
| LaR (uM) | | | | | | | |

H

| | 0 | 6.25 | 12.5 | 25 | 50 | 100 | EnT (uM) |
|---|---|---|---|---|---|---|---|
| 0 | 1.000 | 1.098 | 1.028 | 1.194 | 1.185 | 1.089 | |
| 6.25 | 1.142 | 1.137 | 1.134 | 1.197 | 1.098 | 0.770 | |
| 12.5 | 1.128 | 1.155 | 1.172 | 1.129 | 1.099 | 0.539 | |
| 25 | 1.079 | 1.110 | 1.108 | 1.003 | 0.865 | 0.390 | |
| 50 | 0.755 | 0.723 | 0.688 | 0.585 | 0.509 | 0.328 | |
| 100 | 0.504 | 0.376 | 0.434 | 0.406 | 0.318 | 0.289 | |
| IdE (uM) | | | | | | | |

| | 0 | 0.00625 | 0.0125 | 0.025 | 0.05 | 0.1 | BoR (uM) |
|---|---|---|---|---|---|---|---|
| 0 | 1.000 | 0.367 | 0.272 | 0.215 | 0.176 | 0.141 | |
| 1.56 | 0.762 | 0.281 | 0.177 | 0.191 | 0.170 | 0.131 | |
| 3.125 | 0.519 | 0.115 | 0.116 | 0.121 | 0.119 | 0.114 | |
| 6.25 | 0.123 | 0.123 | 0.120 | 0.116 | 0.112 | 0.110 | |
| 12.5 | 0.117 | 0.132 | 0.126 | 0.123 | 0.117 | 0.112 | |
| 25 | 0.120 | 0.129 | 0.125 | 0.121 | 0.126 | 0.120 | |
| LaP (uM) | | | | | | | |

J

| | 0 | 1.56 | 3.125 | 6.25 | 12.5 | 25 | MaS (uM) |
|---|---|---|---|---|---|---|---|
| 0 | 1.000 | 0.897 | 0.898 | 0.781 | 0.332 | 0.096 | |
| 6.25 | 0.850 | 0.769 | 0.750 | 0.711 | 0.369 | 0.100 | |
| 12.5 | 0.821 | 0.736 | 0.767 | 0.591 | 0.319 | 0.100 | |
| 25 | 0.742 | 0.420 | 0.476 | 0.390 | 0.217 | 0.096 | |
| 50 | 0.359 | 0.113 | 0.110 | 0.114 | 0.105 | 0.094 | |
| 100 | 0.118 | 0.101 | 0.100 | 0.103 | 0.102 | 0.099 | |
| Erl (uM) | | | | | | | |

| AcA (uM) \ FoS (uM) | 0 | 3.125 | 6.25 | 12.5 | 25 | 50 |
|---|---|---|---|---|---|---|
| 0 | 1.000 | 0.986 | 0.806 | 0.400 | 0.222 | 0.212 |
| 6.25 | 0.929 | 1.018 | 0.891 | 0.407 | 0.218 | 0.169 |
| 12.5 | 0.864 | 0.850 | 0.589 | 0.340 | 0.213 | 0.144 |
| 25 | 0.503 | 0.502 | 0.423 | 0.213 | 0.149 | 0.140 |
| 50 | 0.505 | 0.502 | 0.250 | 0.175 | 0.166 | 0.144 |
| 100 | 0.345 | 0.502 | 0.211 | 0.166 | 0.164 | 0.125 |

L

| DaS (uM) \ RIB (uM) | 0 | 3.125 | 6.25 | 12.5 | 25 | 50 |
|---|---|---|---|---|---|---|
| 0 | 1.000 | 1.142 | 1.283 | 1.240 | 1.045 | 0.812 |
| 3.125 | 0.908 | 1.089 | 1.238 | 1.145 | 0.942 | 0.758 |
| 6.25 | 0.895 | 1.199 | 1.153 | 1.178 | 0.855 | 0.523 |
| 12.5 | 0.823 | 0.975 | 1.001 | 0.885 | 0.565 | 0.370 |
| 25 | 0.527 | 0.704 | 0.605 | 0.543 | 0.410 | 0.139 |
| 50 | 0.236 | 0.220 | 0.202 | 0.158 | 0.115 | 0.111 |

| DuV (uM) \ FoS (uM) | 0 | 3.125 | 6.25 | 12.5 | 25 | 50 |
|---|---|---|---|---|---|---|
| 0 | 1.000 | 0.931 | 0.647 | 0.500 | 0.182 | 0.169 |
| 6.25 | 0.946 | 0.594 | 0.442 | 0.285 | 0.163 | 0.142 |
| 12.5 | 0.822 | 0.427 | 0.360 | 0.192 | 0.156 | 0.133 |
| 25 | 0.583 | 0.352 | 0.311 | 0.218 | 0.144 | 0.121 |
| 50 | 0.533 | 0.274 | 0.242 | 0.183 | 0.120 | 0.106 |
| 100 | 0.220 | 0.145 | 0.158 | 0.107 | 0.096 | 0.094 |

N

| DaB (uM) \ DeR (uM) | 0 | 3.125 | 6.25 | 12.5 | 25 | 50 |
|---|---|---|---|---|---|---|
| 0 | 1.000 | 0.890 | 0.188 | 0.096 | 0.095 | 0.096 |
| 3.125 | 0.954 | 0.843 | 0.203 | 0.096 | 0.093 | 0.096 |
| 6.25 | 0.995 | 0.769 | 0.096 | 0.097 | 0.096 | 0.091 |
| 12.5 | 0.918 | 0.757 | 0.242 | 0.095 | 0.095 | 0.093 |
| 25 | 0.656 | 0.502 | 0.303 | 0.093 | 0.093 | 0.093 |
| 50 | 0.310 | 0.195 | 0.172 | 0.091 | 0.099 | 0.093 |

| DxA (uM) \ NIR (uM) | 0 | 3.125 | 6.25 | 12.5 | 25 | 50 |
|---|---|---|---|---|---|---|
| 0 | 1.000 | 0.961 | 0.939 | 0.947 | 0.903 | 0.518 |
| 0.01 | 0.684 | 0.702 | 0.641 | 0.565 | 0.496 | 0.253 |
| 0.02 | 0.525 | 0.522 | 0.512 | 0.446 | 0.321 | 0.121 |
| 0.04 | 0.411 | 0.409 | 0.308 | 0.255 | 0.158 | 0.109 |
| 0.08 | 0.295 | 0.307 | 0.242 | 0.186 | 0.139 | 0.108 |
| 0.16 | 0.263 | 0.224 | 0.176 | 0.148 | 0.123 | 0.106 |

P

| DeF (uM) \ EnT (uM) | 0 | 6.25 | 12.5 | 25 | 50 | 100 |
|---|---|---|---|---|---|---|
| 0 | 1.000 | 1.152 | 1.178 | 1.099 | 0.987 | 0.886 |
| 3.125 | 1.092 | 1.192 | 1.237 | 1.080 | 1.092 | 0.852 |
| 6.25 | 0.854 | 0.919 | 0.947 | 0.799 | 0.767 | 0.696 |
| 12.5 | 0.497 | 0.840 | 0.640 | 0.443 | 0.544 | 0.263 |
| 25 | 0.161 | 0.472 | 0.267 | 0.201 | 0.183 | 0.186 |
| 50 | 0.138 | 0.213 | 0.163 | 0.145 | 0.146 | 0.158 |

| LaP (uM) \ EnA (uM) | 0 | 3.125 | 6.25 | 12.5 | 25 | 50 |
|---|---|---|---|---|---|---|
| 0 | 1.000 | 0.957 | 0.954 | 0.906 | 0.884 | 0.416 |
| 0.78 | 0.845 | 0.781 | 0.733 | 0.721 | 0.433 | 0.241 |
| 1.56 | 0.770 | 0.733 | 0.670 | 0.582 | 0.407 | 0.111 |
| 3.125 | 0.606 | 0.505 | 0.440 | 0.239 | 0.149 | 0.099 |
| 6.25 | 0.115 | 0.113 | 0.112 | 0.110 | 0.109 | 0.109 |
| 12.5 | 0.108 | 0.108 | 0.113 | 0.113 | 0.114 | 0.113 |

R

| DeF (uM) \ IdE (uM) | 0 | 6.25 | 12.5 | 25 | 50 | 100 |
|---|---|---|---|---|---|---|
| 0 | 1.000 | 0.945 | 1.041 | 0.943 | 0.637 | 0.302 |
| 3.125 | 0.756 | 0.684 | 0.805 | 0.730 | 0.466 | 0.302 |
| 6.25 | 0.632 | 0.675 | 0.540 | 0.499 | 0.340 | 0.234 |
| 12.5 | 0.361 | 0.569 | 0.494 | 0.416 | 0.243 | 0.131 |
| 25 | 0.191 | 0.463 | 0.369 | 0.288 | 0.199 | 0.122 |
| 50 | 0.138 | 0.231 | 0.215 | 0.178 | 0.147 | 0.123 |

Fig. 11 (continued)

THERAPEUTIC COMPOSITIONS AND METHODS FOR TREATING CANCERS

RELATED APPLICATIONS

This application is a 35 U.S.C. § 371 filing of International Application No. PCT/US2020/038684 filed Jun. 19, 2020, which claims the benefit of U.S. Provisional Application No. 62/864,870 filed on Jun. 21, 2019, and U.S. Provisional Application No. 63/031,749 filed on May 29, 2020, the entire disclosures of which are hereby incorporated herein by reference.

RELATED APPLICATIONS

This application claims the benefit of U.S. Provisional Application No. 62/864,870 filed on Jun. 21, 2019, and U.S. Provisional Application No. 63/031,749 filed on May 29, 2020, the entire disclosures of which are hereby incorporated herein by reference.

BACKGROUND

Cancer is a general term used to describe diseases in which abnormal cells divide without control. Cancer cells can invade adjacent tissues and can spread through the bloodstream and lymphatic system to other parts of the body. There are different types of cancers such as the bladder cancer, breast cancer, colon cancer, rectal cancer, head and neck cancer, endometrial cancer, kidney (renal cell) cancer, leukemia, small cell lung cancer, non-small cell lung cancer, pancreatic cancer, prostate cancer, thyroid cancer, skin cancer, Non-Hodgkin's Lymphoma and melanoma. Breast cancer is the most common cancer in women, except for skin cancers.

There is a need to develop new treatments for cancers, including but not limited to breast cancer.

SUMMARY

This disclosure provides a pharmaceutical composition comprising a therapeutically effective amount of idelalisib and a therapeutically effective amount of defactinib. In some embodiments, the idelalisib and defactinib are provided in synergistically effective amounts.

In some embodiments, the molar ratio of idelalisib to defactinib is between 2:1 and 4:1. In some embodiments, this disclosure further provides a method of treating cancer in a subject in need thereof, comprising administering to the subject a therapeutically effective amount of the pharmaceutical combination. In some embodiments, the cancer is breast cancer. In some embodiments, the cancer is triple negative breast cancer. In some embodiments, the cancer is luminal A breast cancer. In some embodiments, the cancer is luminal B breast cancer. In some embodiments, the cancer is Her2-enriched breast cancer. In some embodiments, the cancer is normal-like breast cancer. In some embodiments, the cancer is basal-like breast cancer. In some embodiments, the combination of idelalisib and defactinib is at least two times more effective at killing malignant cells than it is at killing non-malignant cells. In some embodiments, the administration of idelalisib and defactinib is simultaneous. In some embodiments, the administration of idelalisib and defactinib is sequential.

This disclosure further provides a method of treating triple negative breast cancer in a subject in need thereof, comprising administering to the subject a therapeutically effective amount of ribociclib and a therapeutically effective amount of dabrafenib. In some embodiments, the ribociclib and dabrafenib are provided in synergistically effective amounts. In some embodiments, the molar ratio of ribociclib to dabrafenib is between 2:1 and 1:2. In some embodiments, the combination of ribociclib and dabrafenib is at least five times more effective at killing malignant cells than it is at killing non-malignant cells. In some embodiments, the administration of ribociclib and dabrafenib is simultaneous. In some embodiments, the administration of ribociclib and dabrafenib is sequential.

This disclosure further provides a method of treating luminal A breast cancer in a subject in need thereof, comprising administering to the subject a therapeutically effective amount of ribociclib and a therapeutically effective amount of dabrafenib. In some embodiments, the ribociclib and dabrafenib are provided in synergistically effective amounts. In some embodiments, the molar ratio of ribociclib to dabrafenib is between 2:1 and 1:2. In some embodiments, the combination of ribociclib and dabrafenib is at least five times more effective at killing malignant cells than it is at killing non-malignant cells. In some embodiments, the administration of ribociclib and dabrafenib is simultaneous. In some embodiments, the administration of ribociclib and dabrafenib is sequential.

This disclosure further provides a method of treating luminal B breast cancer in a subject in need thereof, comprising administering to the subject a therapeutically effective amount of ribociclib and a therapeutically effective amount of dabrafenib. In some embodiments, the ribociclib and dabrafenib are provided in synergistically effective amounts. In some embodiments, the molar ratio of ribociclib to dabrafenib is between 2:1 and 1:2. In some embodiments, the combination of ribociclib and dabrafenib is at least five times more effective at killing malignant cells than it is at killing non-malignant cells. In some embodiments, the administration of ribociclib and dabrafenib is simultaneous. In some embodiments, the administration of ribociclib and dabrafenib is sequential.

This disclosure further provides a method of treating Her2-enriched breast cancer in a subject in need thereof, comprising administering to the subject a therapeutically effective amount of ribociclib and a therapeutically effective amount of dabrafenib. In some embodiments, the ribociclib and dabrafenib are provided in synergistically effective amounts. In some embodiments, the molar ratio of ribociclib to dabrafenib is between 2:1 and 1:2. In some embodiments, the combination of ribociclib and dabrafenib is at least five times more effective at killing malignant cells than it is at killing non-malignant cells. In some embodiments, the administration of ribociclib and dabrafenib is simultaneous. In some embodiments, the administration of ribociclib and dabrafenib is sequential.

This disclosure further provides a method of treating normal-like breast cancer in a subject in need thereof, comprising administering to the subject a therapeutically effective amount of ribociclib and a therapeutically effective amount of dabrafenib. In some embodiments, the ribociclib and dabrafenib are provided in synergistically effective amounts. In some embodiments, the molar ratio of ribociclib to dabrafenib is between 2:1 and 1:2. In some embodiments, the combination of ribociclib and dabrafenib is at least five times more effective at killing malignant cells than it is at killing non-malignant cells. In some embodiments, the administration of ribociclib and dabrafenib is simultaneous. In some embodiments, the administration of ribociclib and dabrafenib is sequential.

This disclosure further provides a method of treating basal-like breast cancer in a subject in need thereof, comprising administering to the subject a therapeutically effective amount of ribociclib and a therapeutically effective amount of dabrafenib. In some embodiments, the ribociclib and dabrafenib are provided in synergistically effective amounts. In some embodiments, the molar ratio of ribociclib to dabrafenib is between 2:1 and 1:2. In some embodiments, the combination of ribociclib and dabrafenib is at least five times more effective at killing malignant cells than it is at killing non-malignant cells. In some embodiments, the administration of ribociclib and dabrafenib is simultaneous. In some embodiments, the administration of ribociclib and dabrafenib is sequential.

This disclosure provides yet another pharmaceutical composition comprising a therapeutically effective amount of niraparib and a therapeutically effective amount of ixazomib. In some embodiments, the niraparib and ixazomib are provided in synergistically effective amounts. In some embodiments, the molar ratio of niraparib to ixazomib is between 312:1 and 1250:1. In some embodiments, this disclosure provides a method of treating cancer in a subject in need thereof, comprising administering to the subject a therapeutically effective amount of the pharmaceutical combination. In some embodiments, the cancer is breast cancer. In some embodiments, the cancer is triple negative breast cancer. In some embodiments, the cancer is luminal A breast cancer. In some embodiments, the cancer is luminal B breast cancer. In some embodiments, the cancer is Her2-enriched breast cancer. In some embodiments, the cancer is normal-like breast cancer. In some embodiments, the cancer is basal-like breast cancer. In some embodiments, the administration of niraparib and ixazomib is simultaneous. In some embodiments, the administration of niraparib and ixazomib is sequential.

This disclosure further provides a method of treating cancer in a subject in need thereof, comprising administering to the subject a therapeutically effective amount of bortezomib and a therapeutically effective amount of lapatinib. In some embodiments, the cancer is breast cancer.

This disclosure further provides a method of treating cancer in a subject in need thereof, comprising administering to the subject a therapeutically effective amount of bortezomib and a therapeutically effective amount of enasidenib. In some embodiments, the cancer is breast cancer.

This disclosure further provides a method of treating cancer in a subject in need thereof, comprising administering to the subject a therapeutically effective amount of bortezomib and a therapeutically effective amount of abemaciclib. In some embodiments, the cancer is breast cancer.

This disclosure further provides a method of treating cancer in a subject in need thereof, comprising administering to the subject a therapeutically effective amount of niraparib and a therapeutically effective amount of ixazomib. In some embodiments, the cancer is breast cancer.

This disclosure further provides a method of treating cancer in a subject in need thereof, comprising administering to the subject a therapeutically effective amount of oprozomib and a therapeutically effective amount of roblitinib. In some embodiments, the cancer is breast cancer.

This disclosure further provides a method of treating cancer in a subject in need thereof, comprising administering to the subject a therapeutically effective amount of masitinib and a therapeutically effective amount of larotrectinib. In some embodiments, the cancer is breast cancer.

This disclosure further provides a method of treating cancer in a subject in need thereof, comprising administering to the subject a therapeutically effective amount of masitinib and a therapeutically effective amount of sonidegib. In some embodiments, the cancer is breast cancer.

This disclosure further provides a method of treating cancer in a subject in need thereof, comprising administering to the subject a therapeutically effective amount of entospletinib and a therapeutically effective amount of idelalisib. In some embodiments, the cancer is breast cancer.

This disclosure further provides a method of treating cancer in a subject in need thereof, comprising administering to the subject a therapeutically effective amount of entospletinib and a therapeutically effective amount of bafetinib. In some embodiments, the cancer is breast cancer.

This disclosure further provides a method of treating cancer in a subject in need thereof, comprising administering to the subject a therapeutically effective amount of entospletinib and a therapeutically effective amount of defactinib. In some embodiments, the cancer is breast cancer.

This disclosure further provides a method of treating cancer in a subject in need thereof, comprising administering to the subject a therapeutically effective amount of idelalisib and a therapeutically effective amount of defactinib. In some embodiments, the cancer is breast cancer.

This disclosure further provides a method of treating cancer in a subject in need thereof, comprising administering to the subject a therapeutically effective amount of enasidenib and a therapeutically effective amount of lapatinib. In some embodiments, the cancer is breast cancer.

This disclosure further provides a method of treating cancer in a subject in need thereof, comprising administering to the subject a therapeutically effective amount of fostamatinib and a therapeutically effective amount of acalabrutinib. In some embodiments, the cancer is breast cancer.

This disclosure further provides a method of treating cancer in a subject in need thereof, comprising administering to the subject a therapeutically effective amount of fostamatinib and a therapeutically effective amount of duvelisib. In some embodiments, the cancer is breast cancer.

This disclosure further provides a method of treating cancer in a subject in need thereof, comprising administering to the subject a therapeutically effective amount of ribociclib and a therapeutically effective amount of dabrafenib. In some embodiments, the cancer is breast cancer.

This disclosure further provides a method of treating cancer in a subject in need thereof, comprising administering to the subject a therapeutically effective amount of derazantinib and a therapeutically effective amount of dabrafenib. In some embodiments, the cancer is breast cancer.

This disclosure further provides a method of treating cancer in a subject in need thereof, comprising administering to the subject a therapeutically effective amount of bortezomib and a therapeutically effective amount of derazantinib. In some embodiments, the cancer is breast cancer.

This disclosure further provides a method of treating breast cancer in a subject in need thereof, comprising administering to the subject a therapeutically effective amount of acalabrutinib. This disclosure further provides a method of treating breast cancer in a subject in need thereof, comprising administering to the subject a therapeutically effective amount of bafetinib. This disclosure further provides a method of treating breast cancer in a subject in need thereof, comprising administering to the subject a therapeutically effective amount of defactinib. This disclosure further provides a method of treating breast cancer in a subject in need thereof, comprising administering to the subject a therapeutically effective amount of enasidenib. This disclosure further provides a method of treating breast cancer in a subject in need thereof, comprising administering to the subject a therapeutically effective amount of entospletinib. This disclosure further provides a method of treating breast cancer in a subject in need thereof, comprising administering to the subject a therapeutically effective amount of oprozomib. This disclosure further provides a method of treating breast cancer in a subject in need thereof, comprising administering to the subject a therapeutically effective amount of roblitinib. This disclosure further provides a method of treating breast cancer in a subject in need thereof, comprising administering to the subject a therapeutically effective amount of fostamatinib. This disclosure further provides a method of treating breast cancer in a subject in need thereof, comprising administering to the subject a therapeutically effective amount of derazantinib.

BRIEF DESCRIPTION OF THE DRAWINGS

FIG. 4 is a table showing the IC50 values determined by drug-response assays.

FIG. 8A includes images for bortezomib, lapatinib, bortezomib+lapatinib, enasidenib, bortezomib+enasidenib, abemaciclib, and bortezomib+abemaciclib; FIG. 8B includes images for niraparib, ixazomib, niraparib+ixazomib, oprozomib, roblitinib, and oprozomib+roblitinib; FIG. 8C includes images for masitinib, larotrectinib, masitinib+larotrectinib, sonidegib, and masitinib+sonidegib; FIG. 8D includes images for entospletinib, idelalisib, entospletinib+idelalisib, bafetinib, and entospletinib+bafetinib; FIG. 8E includes images for defactinib, defactinib+entospletinib, idelalisib+defactinib, and enasidenib+lapatinib; FIG. 8F includes images for fostamatinib, acalabrutinib, fostamatinib+acalabrutinib, duvelisib, and fostamatinib+duvelisib; FIG. 8G includes images for dabrafenib, ribociclib, ribociclib+dabrafenib, derazantinib, derazantinib+dabrafenib, and bortezomib+derazantinib.

FIG. 10 is a schematic summarizing the drug effects on non-malignant and malignant breast epithelial cells in 3D culture.

FIG. 11 are tables showing the results of combinations of compounds tested on a 6×6 matrix on 2D culture for synergistic dosing; the combinations include bafetinib and entospletinib (FIG. 11A), lapatinib and enasidenib (FIG. 11B), derazantinib and bortezomib (FIG. 11C), bortezomib and enasidenib (FIG. 11D), roblitinib and oprozomib (FIG. 11E), bortezomib and abemaciclib (FIG. 11F), larotrectinib sulfate and masitinib (FIG. 11G), idelalisib and entospletinib (FIG. 11H), lapatinib and bortezomib (FIG. 11I), erismodegib and masitinib (FIG. 11J), acalabrutinib and fostamatinib (FIG. 11K), dabrafenib and ribociclib (FIG. 11L) duvelisib and fostamatinib (FIG. 11M), dabrafenib and derazantinib (FIG. 11N), ixazomib and niraparib (FIG. 11O), defactinib and entospletinib (FIG. 11P), lapatinib and enasidenib (FIG. 11Q), defactinib and idelalisib (FIG. 11R).

DETAILED DESCRIPTION

Figure 1:
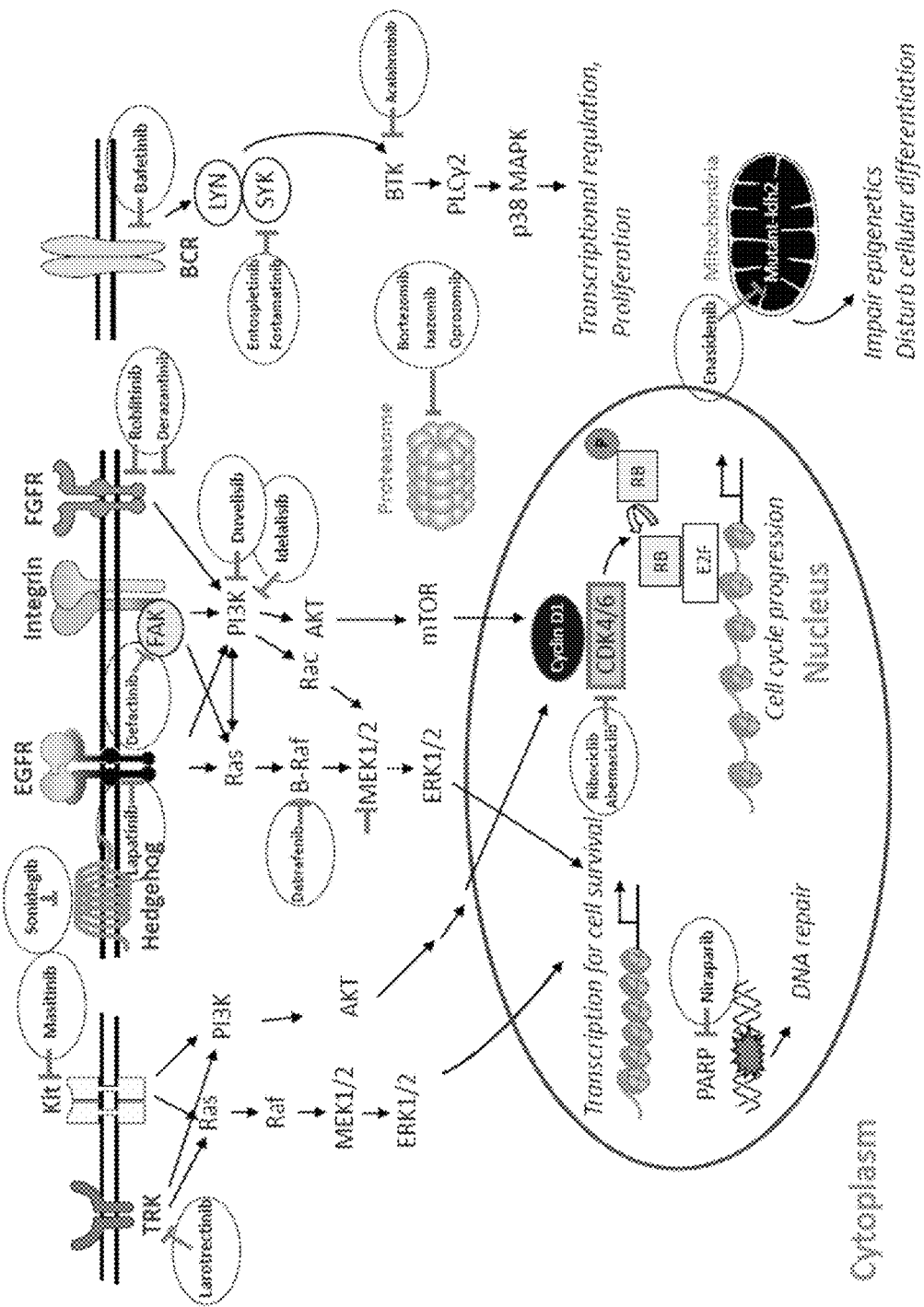
FIG. 1 is a diagram representing the signaling pathways targeted.

The disclosure provides combinations of chemotherapeutics which have unexpectedly been found to be synergistically effective in the treatment of various cancers. The combinations include idelalisib with defactinib, ribociclib with dabrafenib, and niraparib with ixazomib. In some embodiments, the cancer to be treated is triple negative breast cancer. In some embodiments, the cancer to be treated is luminal A breast cancer. In some embodiments, the cancer to be treated is luminal B breast cancer. In some embodiments, the cancer to be treated is Her2-enriched breast cancer. In some embodiments, the cancer to be treated is normal-like breast cancer. In some embodiments, the cancer to be treated is basal-like breast cancer.

Definitions

It is to be understood that the terminology used herein is for the purpose of describing particular embodiments only, and is not intended to be limiting. As used in this specification and the appended claims, the singular forms "a," "an," and "the" include plural referents unless the context clearly dictates otherwise. Thus, for example, reference to "an excipient" includes a combination of two or more such excipients, reference to "an active pharmaceutical ingredient" includes one or more active pharmaceutical ingredients, and the like. Unless specifically stated or obvious from context, as used herein, the term "or" is understood to be inclusive and covers both "or" and "and."

As used in this application, the terms "about" and "approximately" are used as equivalents. Any numerals used in this application with or without about/approximately are meant to cover any normal fluctuations appreciated by one of ordinary skill in the relevant art. In certain embodiments, the term "approximately" or "about" refers to a range of values that fall within 5% or less in either direction (greater than or less than) of the stated reference value unless otherwise stated or otherwise evident from the context (except where such number would exceed 100% of a possible value).

Unless defined otherwise, all technical and scientific terms used herein have the same meaning as commonly understood by one of ordinary skill in the art to which the invention pertains. Although other methods, systems, and networks similar, or equivalent, to those described herein can be used in the practice of the present invention, the preferred materials and methods are described herein.

In describing and claiming the present invention, the following terminology will be used in accordance with the definitions set out below.

The terms "subject" and "patient" as used herein refers to any member of the subphylum Chordata, including, without limitation, humans and other primates, including non-human primates such as rhesus macaques and other monkey species and chimpanzees and other ape species; farm animals such as cattle, sheep, pigs, goats, and horses; domestic mammals such as dogs and cats; laboratory animals including rodents such as mice, rats, and guinea pigs; birds, including domestic, wild, and game birds such as chickens, turkeys, and other gallinaceous birds, ducks, geese, and the like. The term does not denote a particular age or gender. Thus, both adult and newborn individuals are intended to be covered.

The terms "administer" and "administering" as used herein refer to providing a therapeutic to a subject. Multiple techniques of administering a therapeutic exist in the art including, but not limited to, intravenous, oral, aerosol, parenteral, ophthalmic, pulmonary, and topical administration. In some embodiments, administration is oral.

The terms "treatment" and "treating" as used herein refer to amelioration of a disease or disorder, or at least one sign or symptom thereof. "Treatment" or "treating" can refer to reducing the progression of a disease or disorder, as determined by, e.g., stabilization of at least one sign or symptom or a reduction in the rate of progression as determined by a reduction in the rate of progression of at least one sign or symptom. In another embodiment, "treatment" or "treating" refers to delaying the onset of a disease or disorder.

The term "therapeutically effective amount" as used herein refers to an amount of a drug, formulation, or composition to achieve a particular biological result. In certain embodiments, a therapeutically effective amount treats or prevents a disease or a disorder, e.g., ameliorates at least one sign or symptom of the disorder. In various embodiments, the disease or disorder is a cancer.

As used herein, the compounds disclosed herein include the pharmaceutical acceptable form thereof. Some examples of the compounds include, but are not limited to, idelalisib, defactinib, ribociclib, niraparib, and ixazomib. As used herein, a "pharmaceutically acceptable form" of a disclosed compound includes, but is not limited to, pharmaceutically acceptable salts, hydrates, solvates, isomers, prodrugs, esters, and isotopically labeled derivatives of disclosed compounds. In one embodiment, a "pharmaceutically acceptable form" includes, but is not limited to, pharmaceutically acceptable salts, isomers, and prodrugs.

In some embodiment, the pharmaceutically acceptable form is a pharmaceutically acceptable salt. The term "pharmaceutically acceptable salt(s)" used herein refers to salts of acidic or basic groups that may be present in compounds used in the present compositions. Compounds included in the present compositions that are basic in nature are capable of forming a wide variety of salts with various inorganic and organic acids. The acids that may be used to prepare pharmaceutically acceptable acid addition salts of such basic compounds are those that form non-toxic acid addition salts, i.e., salts containing pharmacologically acceptable anions, including but not limited to sulfate, citrate, acetate, oxalate, chloride, bromide, iodide, nitrate, sulfate, bisulfate, phosphate, acid phosphate, isonicotinate, acetate, lactate, salicylate, citrate, tartrate, oleate, tannate, pantothenate, bitartrate, ascorbate, succinate, maleate, fumarate, gluconate, glucaronate, saccharate, formate, benzoate, glutamate, methanesulfonate, ethanesulfonate, benzenesulfonate, p-toluenesulfonate and pamoate (i.e., 1,1'-methylene-bis-(2-hydroxy-3-naphthoate)) salts. Compounds included in the present compositions that include an amino moiety may form pharmaceutically acceptable salts with various amino acids, in addition to the acids mentioned above. Compounds included in the present compositions, that are acidic in nature are capable of forming base salts with various pharmacologically acceptable cations. Examples of such salts include alkali metal or alkaline earth metal salts and, particularly, calcium, magnesium, sodium, lithium, zinc, potassium, and iron salts.

In some embodiment, the pharmaceutically acceptable form is a solvate (e.g., a hydrate). As used herein, the term "solvate" refers to compounds that further include a stoichiometric or non-stoichiometric amount of solvent bound by non-covalent intermolecular forces. The solvate may be of a disclosed compound or a pharmaceutically acceptable salt thereof. Where the solvent is water, the solvate is a "hydrate". Pharmaceutically acceptable solvates and hydrates are complexes that, for example, can include 1 to about 100, or 1 to about 10, or one to about 2, about 3 or about 4, solvent or water molecules. It will be understood that the term "compound" as used herein encompasses the compound and solvates of the compound, as well as mixtures thereof.

In some embodiment, the pharmaceutically acceptable form is a prodrug. As used herein, the term "prodrug" refers to compounds that are transformed in vivo to yield a disclosed compound or a pharmaceutically acceptable form of the compound. A prodrug may be inactive when administered to a subject, but is converted in vivo to an active compound, for example, by hydrolysis (e.g., hydrolysis in blood). In certain cases, a prodrug has improved physical and/or delivery properties over the parent compound. Prodrugs are typically designed to enhance pharmaceutically and/or pharmacokinetically based properties associated with the parent compound. Exemplary advantages of a prodrug can include, but are not limited to, its physical properties, such as enhanced water solubility for parenteral administration at physiological pH compared to the parent compound, or it enhances absorption from the digestive tract, or it can enhance drug stability for long-term storage.

The term "prodrug" is also meant to include any covalently bonded carriers, which release the active compound in vivo when such prodrug is administered to a subject. Prodrugs of an active compound, as described herein, may be prepared by modifying functional groups present in the active compound in such a way that the modifications are cleaved, either in routine manipulation or in vivo, to the parent active compound. Prodrugs include compounds wherein a hydroxy, amino or mercapto group is bonded to any group that, when the prodrug of the active compound is administered to a subject, cleaves to form a free hydroxy, free amino or free mercapto group, respectively. Examples of prodrugs include, but are not limited to, acetate, formate and benzoate derivatives of an alcohol or acetamide, formamide and benzamide derivatives of an amine functional group in the active compound and the like.

In some embodiment, the pharmaceutically acceptable form is an isomer. "Isomers" are different compounds that have the same molecular formula. "Stereoisomers" are isomers that differ only in the way the atoms are arranged in space. As used herein, the term "isomer" includes any and all geometric isomers and stereoisomers. For example, "isomers" include geometric double bond cis- and trans-isomers, also termed E- and Z-isomers; R- and S-enantiomers; diastereomers, (d)-isomers and (l)-isomers, racemic mixtures thereof; and other mixtures thereof, as falling within the scope of this disclosure.

The term "synergy" or "synergistic" encompasses a more than additive effect of a combination of two or more agents compared to their individual effects. In certain embodiments, synergy or synergistic effect refers to an advantageous effect of using two or more agents in combination, e.g., in a pharmaceutical composition, or in a method of treatment.

In some embodiments, the synergistic effect is that a lower dosage of one or both of the agents is needed to achieve an effect. For example, the combination can provide a selected effect, e.g., a therapeutic effect, when at least one of the agents is administered at a lower dosage than the dose of that agent that would be required to achieve the same therapeutic effect when the agent is administered as a monotherapy. In certain embodiments, the combination of a first agent and a second agent allows the first agent to be administered.
at a lower dosage than would be required to achieve the same therapeutic effect if the first agent is administered as a monotherapy.

In some embodiments, the synergistic effect is a reduction, prevention, delay, or decrease in the occurrence or the likelihood of occurrence of one or more side effects, toxicity, resistance, that would otherwise be associated with administration of at least one of the agents.

In some embodiments, the synergistic effect is a reduction in resistance (e.g., a decrease in a measure of resistance or a decreased likelihood of developing resistance), or a delay in the development of resistance, to at least one of the agents.

Combination therapy, or "in combination with" refer to the use of more than one compound or agent to treat a particular disorder or condition. For example, Compound 1 may be administered in combination with at least one additional therapeutic agent. By "in combination with," it is not intended to imply that the other therapy and Compound 1 must be administered at the same time and/or formulated for delivery together, although these methods of delivery are within the scope of this disclosure. Compound 1 can be administered concurrently with, prior to (e.g., 5 minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, 12 weeks, or 16 weeks before), or subsequent to (e.g., 5 minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, 12 weeks, or 16 weeks after), one or more other additional agents. In general, each therapeutic agent will be administered at a dose and/or on a time schedule determined for that particular agent. The other therapeutic agent can be administered with Compound 1 herein in a single composition or separately in a different composition.

The term "synergy" the interaction or cooperation of two or more substances to produce a combined effect greater than the sum of their separate effects. Several models exist to measure synergy including the highest single agent model (HSA), the Loewe additivity model, and the Bliss independence model, discussed in Berenbaum M C. Pharmacol Rev. 1989; 41:93-141; Loewe S. Arzneimittel-forschung. 1953; 3:285-290 and Bliss CI. Ann Appl Biol. 1939; 26:585-615, incorporated by reference herein in their entireties. Any method for measuring synergy can be used.

The term "cancer" includes, but is not limited to, solid tumors and blood born tumors. The term "cancer" refers to disease of skin tissues, organs, blood, and vessels, including, but not limited to, cancers of the bladder, bone or blood, brain, breast, cervix, chest, colon, endometrium, esophagus, eye, head, kidney, liver, lymph nodes, lung, mouth, neck, ovaries, pancreas, prostate, rectum, stomach, testis, throat, and uterus.

The term "triple negative breast cancer" or "TNBC" refers to any breast cancer that does not express the genes for estrogen receptor (ER), progesterone receptor (PR) and Her2/neu. The term includes primary epithelial TNBCs, as well as TNBC that involved with other tumors. The cancer can include a triple negative carcinoma of the breast, ductal carcinoma of the breast, lobular carcinoma of the breast, undifferentiated carcinoma of the breast, cystosarcoma phyllodes of the breast, angiosarcoma of the breast, and primary lymphoma of the breast. TNBC can also include any stage of triple negative breast cancer, and can include breast neoplasms having histologic and ultrastructual heterogeneity (e.g., mixed cell types).

Idelalisib is an orally bioavailable, small molecule inhibitor of the delta isoform of the 110 kDa catalytic subunit of class I phosphoinositide-3 kinase (PI3K) with potential immunomodulating and antineoplastic activities. Idelalisib has the chemical name of 5-fluoro-3-phenyl-2-[(1S)-1-(7H-purin-6-ylamino)propyl]quinazolin-4-one, and has the structure of formula (I)

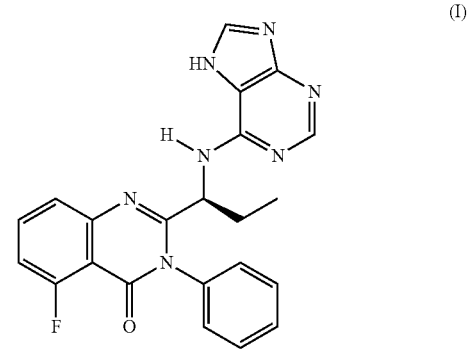 [SMILES: CC[C@H](Nc1ncnc2nc[nH]c12)c1nc2cccc(F)c2c(=O)n1-c1ccccc1]

Defactinib is an orally bioavailable, small-molecule focal adhesion kinase (FAK) inhibitor with potential antiangiogenic and antineoplastic activities. Defactinib has the chemical name of N-methyl-4-[[4-[[3-[methyl(methylsulfonyl)amino]pyrazin-2-yl]methylamino]-5-(trifluoromethyl)pyrimidin-2-yl]amino]benzamide, and has the structure of formula (II)

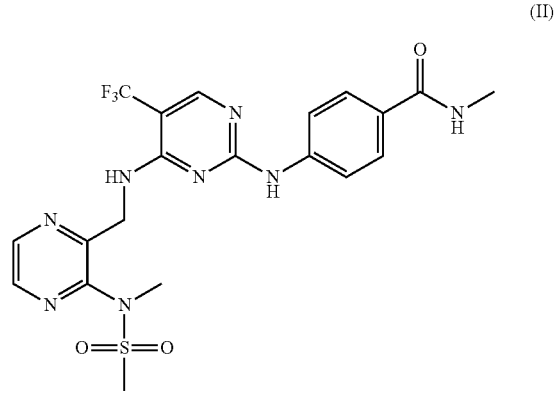 [SMILES: CNC(=O)c1ccc(Nc2ncc(C(F)(F)F)c(NCc3nccnc3N(C)S(C)(=O)=O)n2)cc1]

Ribociclib is an orally available cyclin-dependent kinase (CDK) inhibitor targets at cyclin D1/CDK4 and cyclin D3/CDK6 cell cycle pathway, with potential antineoplastic activity. Ribociclib is also known as LEE011, LEE-011 and Kisqali. Ribociclib has the chemical name of 7-cyclopentyl-N,N-dimethyl-2-[(5-piperazin-1-ylpyridin-2-yl)amino]pyrrolo[2,3-d]pyrimidine-6-carboxamide, and has the structure of formula (III)

(III)

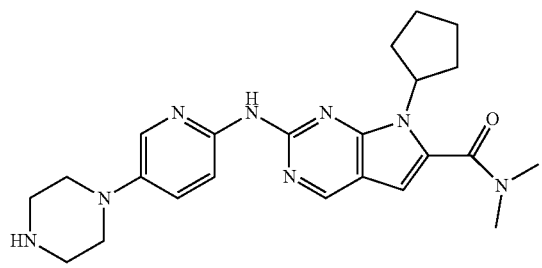

Niraparib is an orally bioavailable inhibitor of poly (ADP-ribose) polymerase (PARP) types 1 and 2 (PARP-1 and -2), with antineoplastic activity. Niraparib is also known as MK-4827, (S)-2-(4-(piperidin-3-yl)phenyl)-2H-indazole-7-carboxamide and ZEJULA. Niraparib has the chemical name of 2-[4-[(3S)-piperidin-3-yl]phenyl]indazole-7-carboxamide, and has the structure of formula (IV)

(IV)

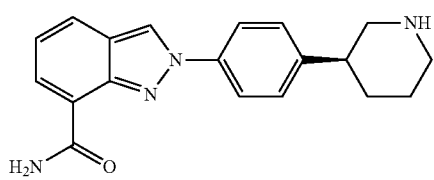

Ixazomib is an active metabolite of MLN9708, a second generation, boron containing peptide proteasome inhibitor (PI) with potential antineoplastic activity. Proteasomes are large protease complexes that degrade unneeded or damaged proteins that have been ubiquitinated. Ixazomib is also known as MLN-2238. Ixazomib has the chemical name of [(1R)-1-[[2-[(2,5-dichlorobenzoyl)amino]acetyl]amino]-3-methylbutyl]boronic acid, and has the structure of formula (V)

(V)

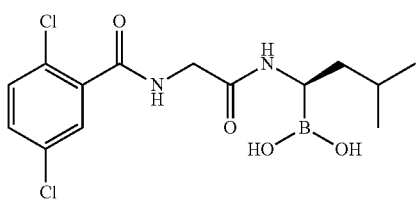

Enasidenib is an orally available inhibitor of specific mutant forms of the mitochondrial enzyme isocitrate dehydrogenase type 2 (IDH2), with potential antineoplastic activity. Enasidenib is also known as AG-221, IDHIFA and UNII-3T1SS4E7AG. Enasidenib has the chemical name of 2-methyl-1-[[4-[6-(trifluoromethyl)pyridin-2-yl]-6-[[2-(trifluoromethyl)pyridin-4-yl]amino]-1,3,5-triazin-2-yl]amino]propan-2-ol, or the structure of formula (VI):

(VI)

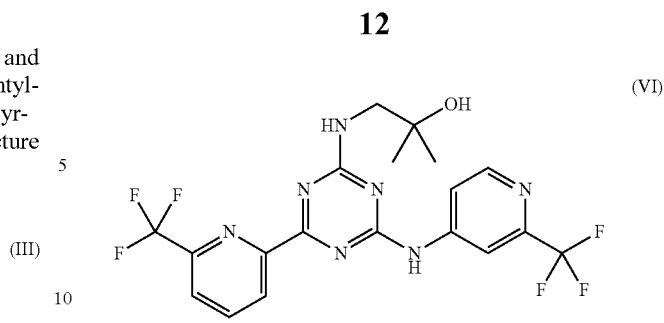

Abemaciclib is an orally available cyclin-dependent kinase (CDK) inhibitor that targets the CDK4 (cyclin D1) and CDK6 (cyclin D3) cell cycle pathway, with potential antineoplastic activity. Abemaciclib is also known as LY2835219 and Verzenio. Abemaciclib has the chemical name of N-[5-[(4-ethylpiperazin-1-yl)methyl]pyridin-2-yl]-5-fluoro-4-(7-fluoro-2-methyl-3-propan-2-ylbenzimidazol-5-yl)pyrimidin-2-amine, and the chemical structure of formula (VII):

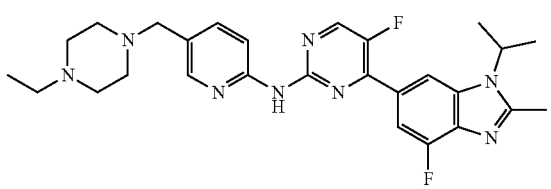 [SMILES: CCN1CCN(Cc2ccc(Nc3ncc(F)c(-c4cc(F)c5nc(C)n(C(C)C)c5c4)n3)nc2)CC1]

Oprozomib is an orally bioavailable proteasome inhibitor with potential antineoplastic activity. Oprozomib is also known as ONX-0912. Oprozomib has the chemical name of N-[(2S)-3-methoxy-1-[[(2S)-3-methoxy-1-[[(2S)-1-[(2R)-2-methyloxiran-2-yl]-1-oxo-3-phenylpropan-2-yl]amino]-1-oxopropan-2-yl]amino]-1-oxopropan-2-yl]-2-methyl-1,3-thiazole-5-carboxamide, and the chemical structure of formula (VIII):

(VIII)

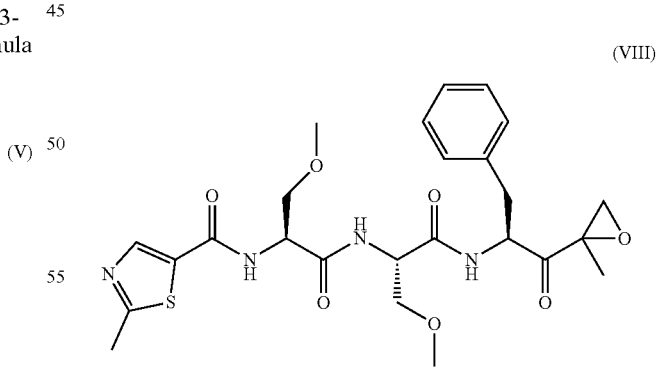

Roblitinib, also known as FGF-401, is a highly selective and potent FGFR4 inhibitor. Roblitinib has the chemical name of N-[5-cyano-4-(2-methoxyethylamino)pyridin-2-yl]-7-formyl-6-[(4-methyl-2-oxopiperazin-1-yl)methyl]-3,4-dihydro-2H-1,8-naphthyridine-1-carboxamide, and the chemical structure of formula (IX):

(IX)

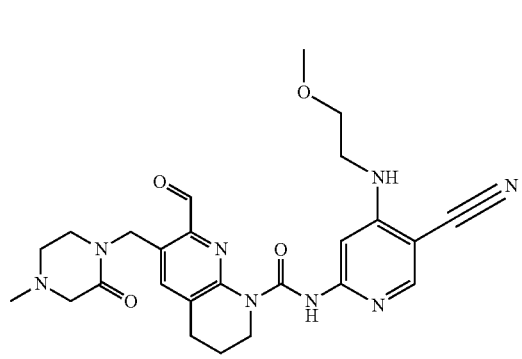

Larotrectinib is an orally available, tropomyosin receptor kinase (Trk) inhibitor, with potential antineoplastic activity. Larotrectinib is also known as ARRY-470, UNII-PF946219HX and LOXO-101. Larotrectinib has the chemical name of (3S)—N-[5-[(2R)-2-(2,5-difluorophenyl)pyrrolidin-1-yl]pyrazolo[1,5-a]pyrimidin-3-yl]-3-hydroxypyrrolidine-1-carboxamide, and the chemical structure of formula (X):

(X)

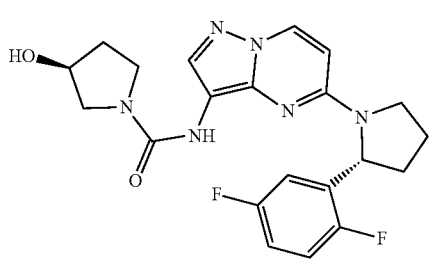

Bafetinib is an orally active 2-phenylaminopyrimidine derivative with potential antineoplastic activity. Bafetinib is also known as INNO-406, NS-187 and UNII-NVW4Z03I9B. Bafetinib has the chemical name of 4-[[(3S)-3-(dimethylamino)pyrrolidin-1-yl]methyl]-N-[4-methyl-3-[(4-pyrimidin-5-ylpyrimidin-2-yl)amino]phenyl]-3-(trifluoromethyl)benzamide, and the chemical structure of formula (XI):

(XI)

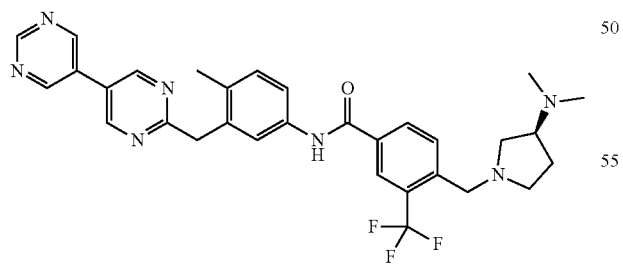

Acalabrutinib is an orally available inhibitor of Bruton's tyrosine kinase (BTK) with potential antineoplastic activity. Acalabrutinib is also known as ACP-196, Calquence and UNII-142748ELQW. Acalabrutinib has the chemical name of 4-[8-amino-3-[(2S)-1-but-2-ynoylpyrrolidin-2-yl]imidazo[1,5-a]pyrazin-1-yl]-N-pyridin-2-ylbenzamide, and the chemical structure of formula (XII):

(XII)

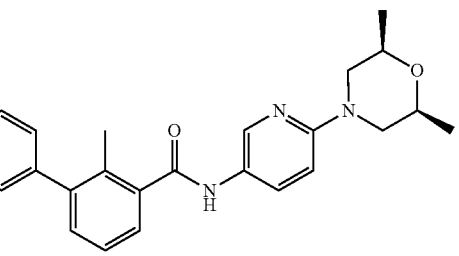

Sonidegib is an orally bioavailable small-molecule smoothened (Smo) antagonist with potential antineoplastic activity. Sonidegib is also known as LDE225, NVP-LDE225 and Erismodegib. Sonidegib has the chemical name of N-[6-[(2S,6R)-2,6-dimethylmorpholin-4-yl]pyridin-3-yl]-2-methyl-3-[4-(trifluoromethoxy)phenyl]benzamide, and the chemical structure of formula (XIII):

(XIII)

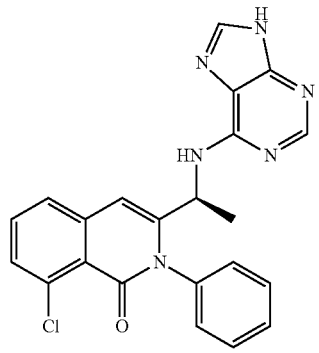

Duvelisib is an orally bioavailable, highly selective and potent small molecule inhibitor of the delta and gamma isoforms of phosphoinositide-3 kinase (PI3K) with potential immunomodulating and antineoplastic activities. Duvelisib is also known as IPI-145 and INK-1197. Duvelisib has the chemical name of (S)-3-(1-((9H-Purin-6-yl)amino)ethyl)-8-chloro-2-phenylisoquinolin-1(2H)-one, and the chemical structure of formula (XIV):

(XIV)

Derazantinib is an orally bioavailable inhibitor of the fibroblast growth factor receptor (FGFR) with potential antineoplastic activity. Derazantinib is also known as ARQ087 and UNII-N9B0H171MJ. Derazantinib has the chemical name of (6R)-6-(2-fluorophenyl)-N-[3-[2-(2-methoxyethylamino)ethyl]phenyl]-5,6-dihydrobenzo[h]quinazolin-2-amine, and the chemical structure of formula (XV):

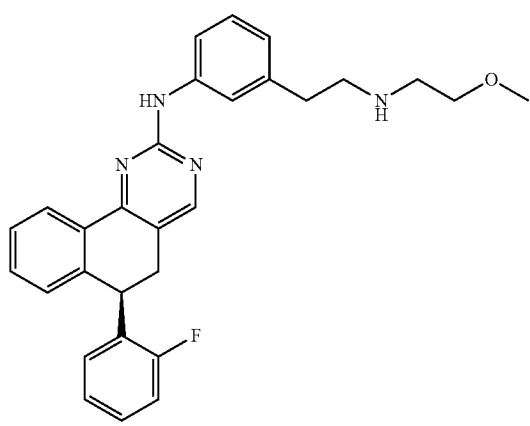

(XV)

Bortezomib is a dipeptide boronic acid analogue with antineoplastic activity. Bortezomib reversibly inhibits the 26S proteasome, a large protease complex that degrades ubiquinated proteins. Bortezomib is also known as Velcade, PS-341 and LDP-341. Bortezomib has the chemical name of [(1R)-3-methyl-1-[[(2S)-3-phenyl-2-(pyrazine-2-carbonylamino)propanoyl]amino]butyl]boronic acid, and the chemical structure of formula (XVI):

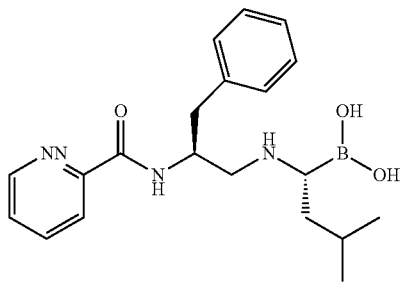

(XVI)

Dabrafenib is an orally bioavailable inhibitor of B-raf (BRAF) protein with potential antineoplastic activity. Dabrafenib is also known as Tafinlar or GSK2118436A. Dabrafenib has the chemical name of N-[3-[5-(2-aminopyrimidin-4-yl)-2-tert-butyl-1,3-thiazol-4-yl]-2-fluorophenyl]-2,6-difluorobenzenesulfonamide, and the chemical structure of formula (XVII):

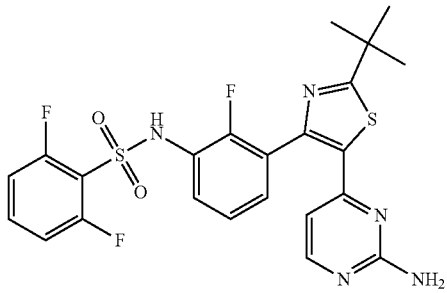

(XVII)

Entospletinib is an orally available inhibitor of spleen tyrosine kinase (Syk), with potential antineoplastic activity. Entospletinib is also known as GS-9973 and UNII-6I3O3W6O3B. Entospletinib has the chemical name of 6-(1H-indazol-6-yl)-N-(4-morpholin-4-ylphenyl)imidazo[1,2-a]pyrazin-8-amine, and the chemical structure of formula (XVIII):

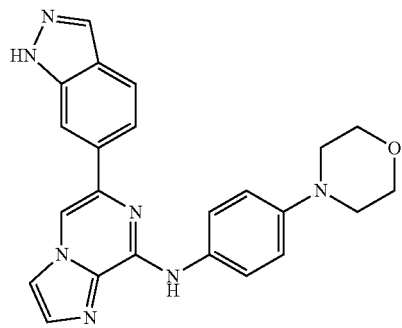

(XVIII)

Masitinib is a highly selective oral tyrosine kinase inhibitor. It is also known as AB1010. Masitinib has the chemical name of 4-[(4-methylpiperazin-1-yl)methyl]-N-[4-methyl-3-[(4-pyridin-3-yl-1,3-thiazol-2-yl)amino]phenyl]benzamide, and the chemical structure of formula (XIX):

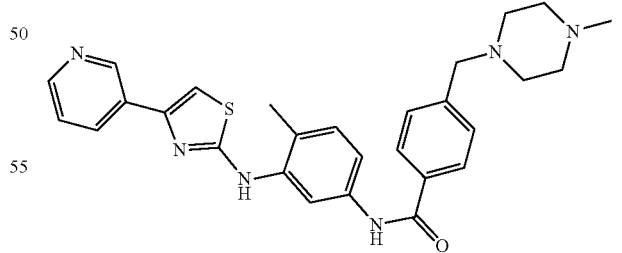

(XIX)

Fostamatinib, also known as R788, is a small molecule Syk kinase inhibitor with potential anti-inflammatory and immunomodulating activities. Fostamatinib has the chemical name of [6-[[5-fluoro-2-(3,4,5-trimethoxyanilino)pyrimidin-4-yl]amino]-2,2-dimethyl-3-oxopyrido[3,2-b][1,4]oxazin-4-yl]methyl dihydrogen phosphate, and the chemical structure of formula (XX):

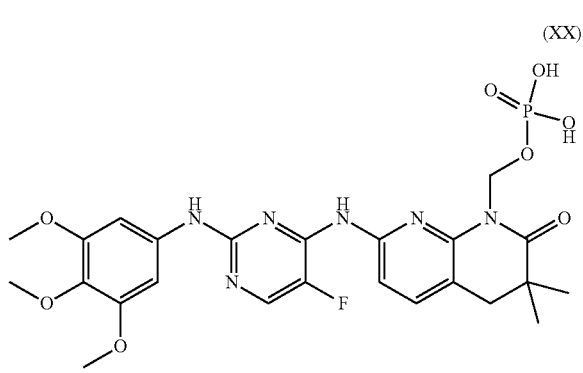 [SMILES: COc1cc(Nc2ncc(F)c(Nc3ccc4c(n3)N(COP(=O)(O)O)C(=O)C(C)(C)C4)n2)cc(OC)c1OC]

Lapatinib reversibly blocks phosphorylation of the epidermal growth factor receptor (EGFR), ErbB2, and the Erk-1 and -2 and AKT kinases; it also inhibits cyclin D protein levels in human tumor cell lines and xenografts. EGFR and ErbB2 have been implicated in the growth of various tumor types. Lapatinib is also known as Tykerb and GW572016. Lapatinib has the chemical name of N-[3-chloro-4-[(3-fluorophenyl)methoxy]phenyl]-6-[5-[(2-methylsulfonylethylamino)methyl]furan-2-yl]quinazolin-4-amine, and the chemical structure of formula (XXI):

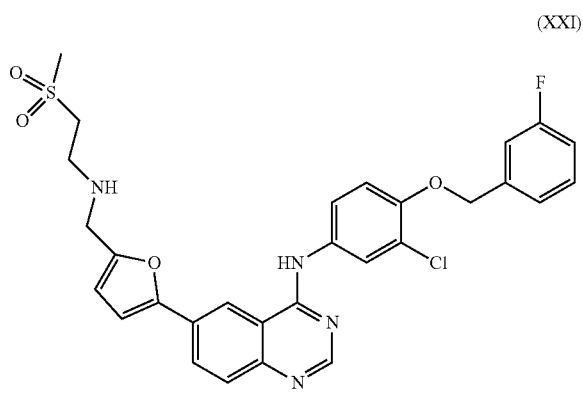 [SMILES: CS(=O)(=O)CCNCc1ccc(-c2ccc3ncnc(Nc4ccc(OCc5cccc(F)c5)c(Cl)c4)c3c2)o1]

General Overview of the Invention

The present disclosure provides therapeutic combinations and methods for treating cancers.

In some embodiments, the present disclosure provides a pharmaceutical composition including a therapeutically effective amount of idelalisib and a therapeutically effective amount of defactinib. In one embodiment, idelalisib and defactinib are provided in synergistically effective amounts.

In some embodiments, the molar ratio of idelalisib or a pharmaceutically acceptable form thereof to defactinib or a pharmaceutically acceptable form thereof is between 1:1 and 5:1. In some embodiments, the molar ratio of idelalisib or a pharmaceutically acceptable form thereof to defactinib or a pharmaceutically acceptable form thereof is between 2:1 and 4:1. In some embodiment, the molar ratio of idelalisib or a pharmaceutically acceptable form thereof to defactinib or a pharmaceutically acceptable form thereof is about 2:1 or about 4:1. In some embodiments, the molar ratio of idelalisib or a pharmaceutically acceptable form thereof to defactinib or a pharmaceutically acceptable form thereof is 2:1 or 4:1.

In some embodiments, the present disclosure provides a method of treating cancer in a subject in need thereof, including administering to the subject a therapeutically effective amount of the pharmaceutical combination including a therapeutically effective amount of idelalisib and a therapeutically effective amount of defactinib. In one embodiment, the cancer is breast cancer. In another embodiment, the cancer is triple negative breast cancer.

In some embodiments, the present disclosure provides a method of treating an intrinsic subtype of breast cancer in a subject in need thereof, including administering to the subject a therapeutically effective amount of the pharmaceutical combination including a therapeutically effective amount of idelalisib and a therapeutically effective amount of defactinib. Classification of intrinsic subtypes of breast cancer may, for example, be performed using the PAM50 subset of genes, which classifies breast cancer into one of five main subtypes based on their genetic signature: (1) luminal A, (2) luminal B, (3) normal-like, (4) Her2-enriched, and (5) basal-like. In one embodiment, the cancer is luminal A breast cancer. In another embodiment, the cancer is luminal B breast cancer. In another embodiment, the cancer is normal-like breast cancer. In yet another embodiment, the cancer is Her2-enriched breast cancer. In still another embodiment, the cancer is basal-like breast cancer.

In some embodiments, the present disclosure provides a method of treating breast cancer that is characterized by the presence or absence of certain receptors in a subject in need thereof, including administering to the subject a therapeutically effective amount of the pharmaceutical combination including a therapeutically effective amount of idelalisib and a therapeutically effective amount of defactinib. In some embodiments, the breast cancer is estrogen receptor positive. In some embodiments, the breast cancer is estrogen receptor negative. In some embodiments, the breast cancer is progesterone receptor positive. In some embodiments, the breast cancer is progesterone receptor negative. In some embodiments, the breast cancer is Her2 positive. In some embodiments, the breast cancer is characterized by over-expression or amplified expression of Her2. In some embodiments, the breast cancer is Her2 negative. In some embodiments, the breast cancer is characterized by high levels of Ki-67. In some embodiments, the breast cancer is characterized by low levels of Ki-67.

In some embodiments, the breast cancer is estrogen receptor positive, progesterone receptor positive, Her2 negative, and characterized by low levels of Ki-67. In some embodiments, the breast cancer is estrogen receptor positive, Her2 negative and characterized by high levels of Ki-67. In some embodiments, the breast cancer is estrogen receptor positive, progesterone receptor positive, and characterized by over-expressed or amplified expression of Her2. In some embodiments, the breast cancer is estrogen receptor negative, progesterone receptor negative, and characterized by over-expressed or amplified expression of Her2. In some embodiments, the breast cancer is estrogen receptor negative, progesterone receptor negative, and Her2 negative.

In another embodiment, the combination of idelalisib and defactinib is at least two times more effective at killing malignant cells than it is at killing non-malignant cells. In another embodiment, the administration of idelalisib and defactinib is simultaneous. In another embodiment, the administration of idelalisib and defactinib is sequential.

In some embodiments, idelalisib and/or defactinib is administered at an amount that is decreased by from about 1.5 fold to about 50 fold, from about 1.5 fold to about 25 fold, from about 1.5 fold to about 20 fold, from about 1.5 fold to about 15 fold, from about 1.5 fold to about 10 fold, from about 2 fold to about 10 fold, from about 2 fold to about 8 fold, from about 4 fold to about 6 fold, or from about 5 fold to about 6 fold of the amount when administered individually.

In some embodiments, the present disclosure provides a method of treating triple negative breast cancer in a subject in need thereof, including administering to the subject a therapeutically effective amount of ribociclib and a therapeutically effective amount of dabrafenib. In one embodiment, ribociclib and dabrafenib are provided in synergistically effective amounts.

In some embodiments, the present disclosure provides a method of treating an intrinsic subtype of breast cancer in a subject in need thereof, including administering to the subject a therapeutically effective amount of ribociclib and a therapeutically effective amount of dabrafenib. Classification of intrinsic subtypes of breast cancer may, for example, be performed using the PAM50 subset of genes, which classifies breast cancer into one of five main subtypes based on their genetic signature: (1) luminal A, (2) luminal B, (3) normal-like, (4) Her2-enriched, and (5) basal-like. In one embodiment, the cancer is luminal A breast cancer. In another embodiment, the cancer is luminal B breast cancer. In another embodiment, the cancer is normal-like breast cancer. In yet another embodiment, the cancer is Her2-enriched breast cancer. In still another embodiment, the cancer is basal-like breast cancer. In some embodiments, ribociclib and dabrafenib are provided in synergistically effective amounts.

In some embodiments, the present disclosure provides a method of treating breast cancer that is characterized by the presence or absence of certain receptors in a subject in need thereof, including administering to the subject a therapeutically effective amount of ribociclib and a therapeutically effective amount of dabrafenib. In some embodiments, the breast cancer is estrogen receptor positive. In some embodiments, the breast cancer is estrogen receptor negative. In some embodiments, the breast cancer is progesterone receptor positive. In some embodiments, the breast cancer is progesterone receptor negative. In some embodiments, the breast cancer is Her2 positive. In some embodiments, the breast cancer is characterized by over-expression or amplified expression of Her2. In some embodiments, the breast cancer is Her2 negative. In some embodiments, the breast cancer is characterized by high levels of Ki-67. In some embodiments, the breast cancer is characterized by low levels of Ki-67. In some embodiments, ribociclib and dabrafenib are provided in synergistically effective amounts.

In some embodiments, the breast cancer is estrogen receptor positive, progesterone receptor positive, Her2 negative, and characterized by low levels of Ki-67. In some embodiments, the breast cancer is estrogen receptor positive, Her2 negative and characterized by high levels of Ki-67. In some embodiments, the breast cancer is estrogen receptor positive, progesterone receptor positive, and characterized by over-expressed or amplified expression of Her2. In some embodiments, the breast cancer is estrogen receptor negative, progesterone receptor negative, and characterized by over-expressed or amplified expression of Her2. In some embodiments, the breast cancer is estrogen receptor negative, progesterone receptor negative, and Her2 negative. In some embodiments, ribociclib and dabrafenib are provided in synergistically effective amounts.

In some embodiments, the molar ratio of ribociclib or a pharmaceutically acceptable form thereof to dabrafenib a pharmaceutically acceptable form thereof is between 1:2 and 6:1. In some embodiments, the molar ratio of ribociclib or a pharmaceutically acceptable form thereof to dabrafenib a pharmaceutically acceptable form thereof is between 1:1 and 4:1. In some embodiments, the molar ratio of ribociclib or a pharmaceutically acceptable form thereof to dabrafenib a pharmaceutically acceptable form thereof is between 2:1 and 4:1. In some embodiments, the molar ratio of ribociclib or a pharmaceutically acceptable form thereof to dabrafenib a pharmaceutically acceptable form thereof is between 1:1 and 2:1. In some embodiments, the molar ratio of ribociclib or a pharmaceutically acceptable form thereof to dabrafenib a pharmaceutically acceptable form thereof is about 1:1, 2:1, 3:1 or 4:1. In some embodiments, the molar ratio of ribociclib or a pharmaceutically acceptable form thereof to dabrafenib a pharmaceutically acceptable form thereof is 1:1, 2:1, 3:1 or 4:1.

In another embodiment, the combination of ribociclib and dabrafenib is at least five times more effective at killing malignant cells than it is at killing non-malignant cells. In another embodiment, the combination of ribociclib and dabrafenib is at least four times more effective at killing malignant cells than it is at killing non-malignant cells. In another embodiment, the combination of ribociclib and dabrafenib is at least three times more effective at killing malignant cells than it is at killing non-malignant cells. In another embodiment, the combination of ribociclib and dabrafenib is at least two times more effective at killing malignant cells than it is at killing non-malignant cells. In another embodiment, the administration of ribociclib and dabrafenib is simultaneous. In another embodiment, the administration of ribociclib and dabrafenib is sequential.

In one embodiment, ribociclib and/or dabrafenib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of niraparib and a therapeutically effective amount of ixazomib. In one embodiment, niraparib and ixazomib are provided in synergistically effective amounts.

In some embodiments, the molar ratio of niraparib or a pharmaceutically acceptable form thereof to ixazomib or a pharmaceutically acceptable form thereof is between 1500:1 and 1000:1. In some embodiments, the molar ratio of niraparib or a pharmaceutically acceptable form thereof to ixazomib or a pharmaceutically acceptable form thereof is about 1500:1, 1250:1 or 1000:1. In some embodiments, the molar ratio of niraparib or a pharmaceutically acceptable form thereof to ixazomib or a pharmaceutically acceptable form thereof is 1500:1, 1250:1 or 1000:1.

In some embodiments, the present disclosure provides a method of treating cancer in a subject in need thereof, including administering to the subject a therapeutically effective amount of the pharmaceutical combination including a therapeutically effective amount of niraparib and a therapeutically effective amount of ixazomib. In one embodiment, the cancer is breast cancer. In another embodiment, the cancer is triple negative breast cancer.

In some embodiments, the present disclosure provides a method of treating an intrinsic subtype of breast cancer in a subject in need thereof, including administering to the subject a therapeutically effective amount of the pharmaceutical combination including a therapeutically effective amount of niraparib and a therapeutically effective amount of ixazomib. Classification of intrinsic subtypes of breast cancer may, for example, be performed using the PAM50 subset of genes, which classifies breast cancer into one of five main subtypes based on their genetic signature: (1) luminal A, (2) luminal B, (3) normal-like, (4) Her2-enriched, and (5) basal-like. In one embodiment, the cancer is luminal A breast cancer. In another embodiment, the cancer is luminal B breast cancer. In another embodiment, the cancer is normal-like breast cancer. In yet another embodiment, the cancer is Her2-enriched breast cancer. In still another embodiment, the cancer is basal-like breast cancer.

In some embodiments, the present disclosure provides a method of treating breast cancer that is characterized by the presence or absence of certain receptors in a subject in need thereof, including administering to the subject a therapeutically effective amount of the pharmaceutical combination including a therapeutically effective amount of niraparib and a therapeutically effective amount of ixazomib. In some embodiments, the breast cancer is estrogen receptor positive. In some embodiments, the breast cancer is estrogen receptor negative. In some embodiments, the breast cancer is progesterone receptor positive. In some embodiments, the breast cancer is progesterone receptor negative. In some embodiments, the breast cancer is Her2 positive. In some embodiments, the breast cancer is characterized by over-expression or amplified expression of Her2. In some embodiments, the breast cancer is Her2 negative. In some embodiments, the breast cancer is characterized by high levels of Ki-67. In some embodiments, the breast cancer is characterized by low levels of Ki-67.

In some embodiments, the breast cancer is estrogen receptor positive, progesterone receptor positive, Her2 negative, and characterized by low levels of Ki-67. In some embodiments, the breast cancer is estrogen receptor positive, Her2 negative and characterized by high levels of Ki-67. In some embodiments, the breast cancer is estrogen receptor positive, progesterone receptor positive, and characterized by over-expressed or amplified expression of Her2. In some embodiments, the breast cancer is estrogen receptor negative, progesterone receptor negative, and characterized by over-expressed or amplified expression of Her2. In some embodiments, the breast cancer is estrogen receptor negative, progesterone receptor negative, and Her2 negative.

In another embodiment, the combination of niraparib and ixazomib is at least five times more effective at killing malignant cells than it is at killing non-malignant cells. In another embodiment, the administration of niraparib and ixazomib is simultaneous. In another embodiment, the administration of niraparib and ixazomib is sequential.

In one embodiment, niraparib and/or ixazomib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of bafetinib and a therapeutically effective amount of entospletinib. In one embodiment, bafetinib and entospletinib are provided in synergistically effective amounts.

In some embodiments, the molar ratio of bafetinib or a pharmaceutically acceptable form thereof to entospletinib or a pharmaceutically acceptable form thereof is between 3:1 and 1:2. In some embodiments, the molar ratio of bafetinib or a pharmaceutically acceptable form thereof to entospletinib or a pharmaceutically acceptable form thereof is about 2:1 or 1:1. In some embodiments, the molar ratio of bafetinib or a pharmaceutically acceptable form thereof to entospletinib or a pharmaceutically acceptable form thereof is 2:1 or 1:1.

In another embodiment, the combination of bafetinib and entospletinib is at least five times more effective at killing malignant cells than it is at killing non-malignant cells. In another embodiment, the administration of bafetinib and entospletinib is simultaneous. In another embodiment, the administration of bafetinib and entospletinib is sequential.

In one embodiment, bafetinib and/or entospletinib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of lapatinib and a therapeutically effective amount of enasidenib. In one embodiment, lapatinib and enasidenib are provided in synergistically effective amounts.

In some embodiments, the molar ratio of lapatinib or a pharmaceutically acceptable form thereof to enasidenib or a pharmaceutically acceptable form thereof is between 2:1 and 1:8. In some embodiments, the molar ratio of lapatinib or a pharmaceutically acceptable form thereof to enasidenib or a pharmaceutically acceptable form thereof is about 1:1, 1:2, or 1:4. In some embodiments, the molar ratio of lapatinib or a pharmaceutically acceptable form thereof to enasidenib or a pharmaceutically acceptable form thereof is 1:1, 1:2, or 1:4.

In another embodiment, the combination of lapatinib and enasidenib is at least five times more effective at killing malignant cells than it is at killing non-malignant cells. In another embodiment, the administration of lapatinib and enasidenib is simultaneous. In another embodiment, the administration of lapatinib and enasidenib is sequential.

In one embodiment, lapatinib and/or enasidenib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of derazantinib and a therapeutically effective amount of bortezomib. In one embodiment, derazantinib and bortezomib are provided in synergistically effective amounts.

In some embodiments, the molar ratio of derazantinib or a pharmaceutically acceptable form thereof to bortezomib or a pharmaceutically acceptable form thereof is between 1000:1 and 4000:1. In some embodiments, the molar ratio of derazantinib or a pharmaceutically acceptable form thereof to bortezomib or a pharmaceutically acceptable form thereof is about 1560:1, 2000:1, or 3125:1. In some embodiments, the molar ratio of derazantinib or a pharmaceutically acceptable form thereof to bortezomib or a pharmaceutically acceptable form thereof is 1560:1, 2000:1, or 3125:1.

In another embodiment, the combination of derazantinib and bortezomib is at least five times more effective at killing malignant cells than it is at killing non-malignant cells. In another embodiment, the administration of derazantinib and bortezomib is simultaneous. In another embodiment, the administration of derazantinib and bortezomib is sequential.

In one embodiment, derazantinib and/or bortezomib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of bortezomib and a therapeutically effective amount of enasidenib. In one embodiment, bortezomib and enasidenib are provided in synergistically effective amounts.

In some embodiments, the molar ratio of bortezomib or a pharmaceutically acceptable form thereof to enasidenib or a pharmaceutically acceptable form thereof is between 1:2000 and 1:30. In some embodiments, the molar ratio of bortezomib or a pharmaceutically acceptable form thereof to enasidenib or a pharmaceutically acceptable form thereof is about 1:1000, 1:500, 1:250, 1:125, 2:125, or 4:125. In some embodiments, the molar ratio of bortezomib or a pharmaceutically acceptable form thereof to enasidenib or a pharmaceutically acceptable form thereof is 1:1000, 1:500, 1:250, 1:125, 2:125, or 4:125.

In another embodiment, the combination of bortezomib and enasidenib is at least five times more effective at killing malignant cells than it is at killing non-malignant cells. In another embodiment, the administration of bortezomib and enasidenib is simultaneous. In another embodiment, the administration of bortezomib and enasidenib is sequential.

In one embodiment, bortezomib and/or enasidenib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of roblitinib and a therapeutically effective amount of oprozomib. In one embodiment, roblitinib and oprozomib are provided in synergistically effective amounts.

In some embodiments, the molar ratio of roblitinib or a pharmaceutically acceptable form thereof to oprozomib or a pharmaceutically acceptable form thereof is between 10,000:1 to 1000:1. In some embodiments, the molar ratio of roblitinib or a pharmaceutically acceptable form thereof to oprozomib or a pharmaceutically acceptable form thereof is about 3125:2. In some embodiments, the molar ratio of roblitinib or a pharmaceutically acceptable form thereof to oprozomib or a pharmaceutically acceptable form thereof is 3125:2.

In another embodiment, the combination of roblitinib and oprozomib is at least five times more effective at killing malignant cells than it is at killing non-malignant cells. In another embodiment, the administration of roblitinib and oprozomib is simultaneous. In another embodiment, the administration of roblitinib and oprozomib is sequential.

In one embodiment, roblitinib and/or oprozomib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of bortezomib and a therapeutically effective amount of abemaciclib. In one embodiment, bortezomib and abemaciclib are provided in synergistically effective amounts.

In some embodiments, the molar ratio of bortezomib or a pharmaceutically acceptable form thereof to abemaciclib or a pharmaceutically acceptable form thereof is between 1:3000 to 1:500. In some embodiments, the molar ratio of bortezomib or a pharmaceutically acceptable form thereof to abemaciclib or a pharmaceutically acceptable form thereof is about 1:2000, or 1:1000. In some embodiments, the molar ratio of bortezomib or a pharmaceutically acceptable form thereof to abemaciclib or a pharmaceutically acceptable form thereof is 1:2000 or 1:1000.

In another embodiment, the combination of bortezomib and abemaciclib is at least five times more effective at killing malignant cells than it is at killing non-malignant cells. In another embodiment, the administration of bortezomib and abemaciclib is simultaneous. In another embodiment, the administration of bortezomib and abemaciclib is sequential.

In one embodiment, bortezomib and/or abemaciclib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of larotrectinib and a therapeutically effective amount of masitinib. In one embodiment, larotrectinib and masitinib are provided in synergistically effective amounts.

In some embodiments, the molar ratio of larotrectinib or a pharmaceutically acceptable form thereof to masitinib or a pharmaceutically acceptable form thereof is between 20:1 to 12:1. In some embodiments, the molar ratio of larotrectinib or a pharmaceutically acceptable form thereof to masitinib or a pharmaceutically acceptable form thereof is about 16:1. In some embodiments, the molar ratio of larotrectinib or a pharmaceutically acceptable form thereof to masitinib or a pharmaceutically acceptable form thereof is 16:1.

In another embodiment, the combination of larotrectinib and masitinib is at least five times more effective at killing malignant cells than it is at killing non-malignant cells. In another embodiment, the administration of larotrectinib and masitinib is simultaneous. In another embodiment, the administration of larotrectinib and masitinib is sequential.

In one embodiment, larotrectinib and/or masitinib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of idelalisib and a therapeutically effective amount of entospletinib. In one embodiment, idelalisib and entospletinib are provided in synergistically effective amounts.

In some embodiments, the molar ratio of idelalisib or a pharmaceutically acceptable form thereof to entospletinib or a pharmaceutically acceptable form thereof is between 3:1 to 1:2. In some embodiments, the molar ratio of idelalisib or a pharmaceutically acceptable form thereof to entospletinib or a pharmaceutically acceptable form thereof is about 2:1 or 1:1. In some embodiments, the molar ratio of idelalisib or a pharmaceutically acceptable form thereof to entospletinib or a pharmaceutically acceptable form thereof is 2:1 or 1:1.

In another embodiment, the combination of idelalisib and entospletinib is at least five times more effective at killing malignant cells than it is at killing non-malignant cells. In another embodiment, the administration of idelalisib and entospletinib is simultaneous. In another embodiment, the administration of idelalisib and entospletinib is sequential.

In one embodiment, idelalisib and/or entospletinib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of lapatinib and a therapeutically effective amount of bortezomib. In one embodiment, lapatinib and bortezomib are provided in synergistically effective amounts.

In some embodiments, the molar ratio of lapatinib or a pharmaceutically acceptable form thereof to bortezomib or a pharmaceutically acceptable form thereof is between 300:1 to 200:1. In some embodiments, the molar ratio of lapatinib or a pharmaceutically acceptable form thereof to bortezomib or a pharmaceutically acceptable form thereof is about 250:1. In some embodiments, the molar ratio of lapatinib or a pharmaceutically acceptable form thereof to bortezomib or a pharmaceutically acceptable form thereof is 249.6:1.

In another embodiment, the combination of lapatinib and bortezomib is at least five times more effective at killing malignant cells than it is at killing non-malignant cells. In another embodiment, the administration of lapatinib and bortezomib is simultaneous. In another embodiment, the administration of lapatinib and bortezomib is sequential.

In one embodiment, lapatinib and/or bortezomib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of erismodegib and a therapeutically effective amount of masitinib. In one embodiment, erismodegib and masitinib are provided in synergistically effective amounts.

In some embodiments, the molar ratio of erismodegib or a pharmaceutically acceptable form thereof to masitinib or a pharmaceutically acceptable form thereof is between 1:1 to 10:1. In some embodiments, the molar ratio of erismodegib or a pharmaceutically acceptable form thereof to masitinib or a pharmaceutically acceptable form thereof is about 2:1, 4:1, or 8:1. In some embodiments, the molar ratio of erismodegib or a pharmaceutically acceptable form thereof to masitinib or a pharmaceutically acceptable form thereof is 2:1, 4:1, or 8:1.

In another embodiment, the combination of erismodegib and masitinib is at least five times more effective at killing malignant cells than it is at killing non-malignant cells. In another embodiment, the administration of erismodegib and masitinib is simultaneous. In another embodiment, the administration of erismodegib and masitinib is sequential.

In one embodiment, erismodegib and/or masitinib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually. In some embodiments, the present disclosure provides a pharmaceutical composition including a therapeutically effective amount of acalabrutinib and a therapeutically effective amount of fostamatinib. In one embodiment, acalabrutinib and fostamatinib are provided in synergistically effective amounts.

In some embodiments, the molar ratio of acalabrutinib or a pharmaceutically acceptable form thereof to fostamatinib or a pharmaceutically acceptable form thereof is between 1:2 to 6:1. In some embodiments, the molar ratio of acalabrutinib or a pharmaceutically acceptable form thereof to fostamatinib or a pharmaceutically acceptable form thereof is about 1:1, 2:1, or 4:1. In some embodiments, the molar ratio of acalabrutinib or a pharmaceutically acceptable form thereof to fostamatinib or a pharmaceutically acceptable form thereof is 1:1, 2:1, or 4:1.

In another embodiment, the combination of acalabrutinib and fostamatinib is at least five times more effective at killing malignant cells than it is at killing non-malignant cells. In another embodiment, the administration of acalabrutinib and fostamatinib is simultaneous. In another embodiment, the administration of acalabrutinib and fostamatinib is sequential.

In one embodiment, acalabrutinib and/or fostamatinib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of duvelisib and a therapeutically effective amount of fostamatinib. In one embodiment, duvelisib and fostamatinib are provided in synergistically effective amounts.

In some embodiments, the molar ratio of duvelisib or a pharmaceutically acceptable form thereof to fostamatinib or a pharmaceutically acceptable form thereof is between 1:1 to 10:1. In some embodiments, the molar ratio of duvelisib or a pharmaceutically acceptable form thereof to fostamatinib or a pharmaceutically acceptable form thereof is about 2:1, 4:1, or 8:1. In some embodiments, the molar ratio of duvelisib or a pharmaceutically acceptable form thereof to fostamatinib or a pharmaceutically acceptable form thereof is 2:1, 4:1, or 8:1.

In another embodiment, the combination of duvelisib and fostamatinib is at least five times more effective at killing malignant cells than it is at killing non-malignant cells. In another embodiment, the administration of duvelisib and fostamatinib is simultaneous. In another embodiment, the administration of duvelisib and fostamatinib is sequential.

In one embodiment, duvelisib and/or fostamatinib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of dabrafenib and a therapeutically effective amount of derazantinib. In one embodiment, dabrafenib and derazantinib are provided in synergistically effective amounts.

In some embodiments, the molar ratio of dabrafenib or a pharmaceutically acceptable form thereof to derazantinib or a pharmaceutically acceptable form thereof is between 3:1 to 18:1. In some embodiments, the molar ratio of dabrafenib or a pharmaceutically acceptable form thereof to derazantinib or a pharmaceutically acceptable form thereof is about 4:1, 8:1, or 16:1. In some embodiments, the molar ratio of dabrafenib or a pharmaceutically acceptable form thereof to derazantinib or a pharmaceutically acceptable form thereof is 4:1, 8:1, or 16:1.

In another embodiment, the combination of dabrafenib and derazantinib is at least five times more effective at killing malignant cells than it is at killing non-malignant cells. In another embodiment, the administration of dabrafenib and derazantinib is simultaneous. In another embodiment, the administration of dabrafenib and derazantinib is sequential.

In one embodiment, dabrafenib and/or derazantinib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of defactinib and a therapeutically effective amount of entospletinib. In one embodiment, defactinib and entospletinib are provided in synergistically effective amounts.

In some embodiments, the molar ratio of defactinib or a pharmaceutically acceptable form thereof to entospletinib or a pharmaceutically acceptable form thereof is between 1:6 to 1:10. In some embodiments, the molar ratio of defactinib or a pharmaceutically acceptable form thereof to entospletinib or a pharmaceutically acceptable form thereof is about 1:8. In some embodiments, the molar ratio of defactinib or a pharmaceutically acceptable form thereof to entospletinib or a pharmaceutically acceptable form thereof is 1:8.

In another embodiment, the combination of defactinib and entospletinib is at least five times more effective at killing malignant cells than it is at killing non-malignant cells. In another embodiment, the administration of defactinib and entospletinib is simultaneous. In another embodiment, the administration of defactinib and entospletinib is sequential.

In one embodiment, defactinib and/or entospletinib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

In some embodiments, the present disclosure provides a pharmaceutical composition including a therapeutically effective amount of lapatinib and a therapeutically effective amount of enasidenib. In one embodiment, lapatinib and enasidenib are provided in synergistically effective amounts.

In some embodiments, the molar ratio of lapatinib or a pharmaceutically acceptable form thereof to enasidenib or a pharmaceutically acceptable form thereof is between 1:6 to 1:10. In some embodiments, the molar ratio of lapatinib or a pharmaceutically acceptable form thereof to enasidenib or a pharmaceutically acceptable form thereof is about 1:8. In some embodiments, the molar ratio of lapatinib or a pharmaceutically acceptable form thereof to enasidenib or a pharmaceutically acceptable form thereof is 1:8.

In another embodiment, the combination of lapatinib and enasidenib is at least five times more effective at killing malignant cells than it is at killing non-malignant cells. In another embodiment, the administration of lapatinib and enasidenib is simultaneous. In another embodiment, the administration of lapatinib and enasidenib is sequential.

In one embodiment, lapatinib and/or enasidenib is administered at an amount that is decreased by about 1.5 fold to about 50 fold, about 1.5 fold to about 25 fold, about 1.5 fold to about 20 fold, about 1.5 fold to about 15 fold, about 1.5 fold to about 10 fold, about 2 fold to about 10 fold, about 2 fold to about 8 fold, about 4 fold to about 6 fold, or about 5 fold to about 6 fold of the amount when administered individually.

EXAMPLE

Example 1

Figure 2:
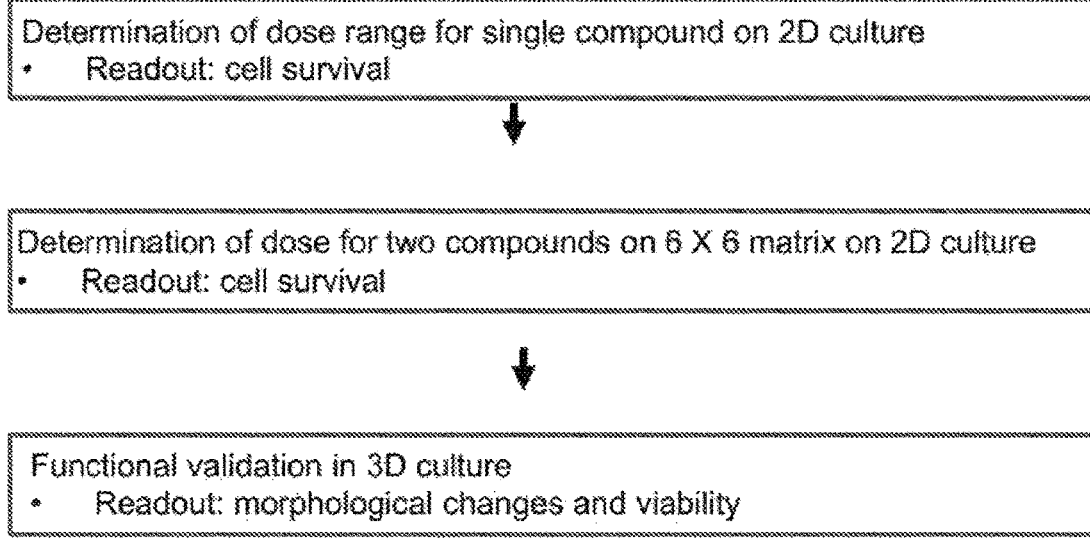
FIG. 2 is a diagram showing the workflow of target validation

Twenty-one compounds were received and reconstituted to yield 10 mM stock solution. The compounds were known to have the biological effects shown in FIG. 1. Compounds were independently tested on a 2D culture assay to determine cell survival. Combinations of compounds were then tested on a 6×6 matrix on 2D culture to determine synergistic dosing. Then functional validation of the synergistic combinations was determined in 3D culture. (See FIG. 2).

Figure 3:
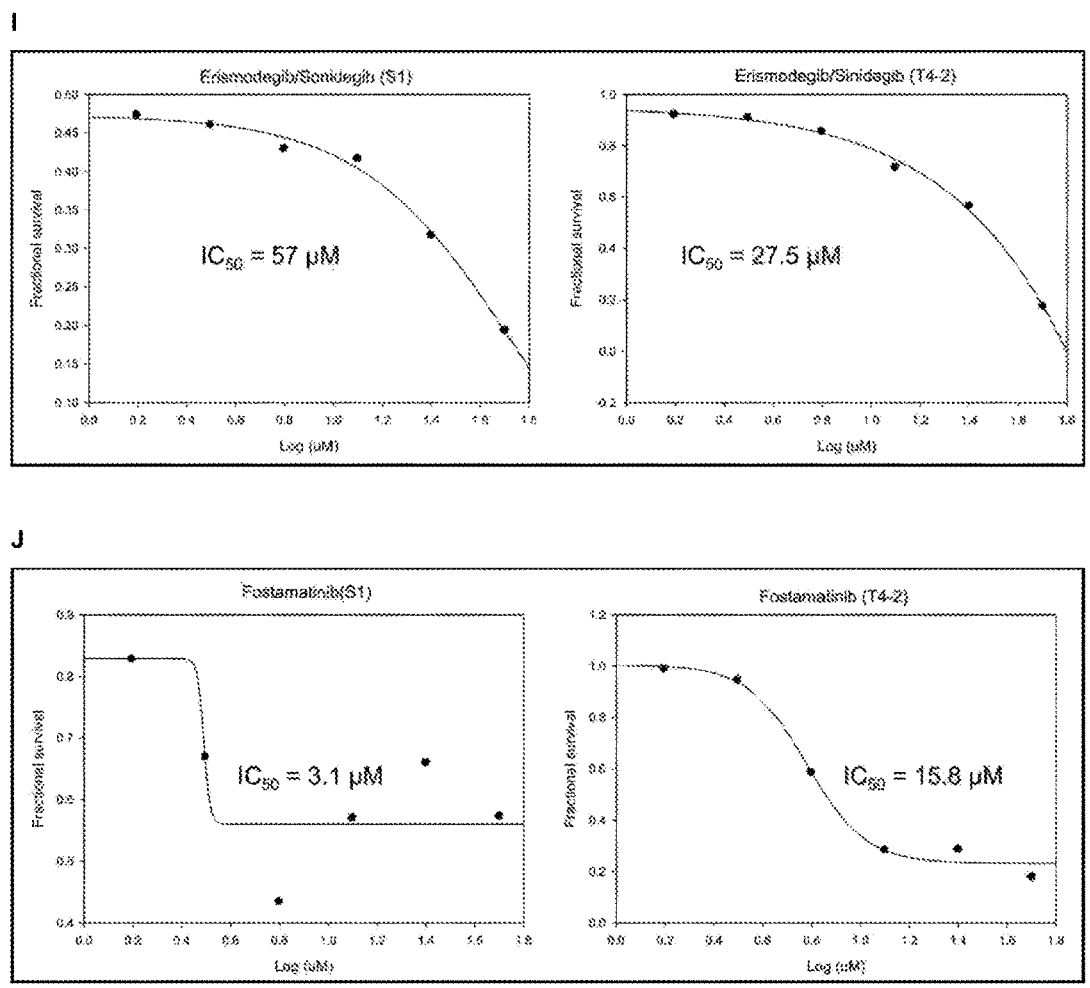
FIG. 3 is the graph showing the dose ranges and IC50 values of abemaciclib (FIG. 3A), bafetinib (FIG. 3B), bortezomib (FIG. 3C), dabrafenib (FIG. 3D), defactinib (FIG. 3E), derazantinib (FIG. 3F), duvelisib (FIG. 3G), enasidenib (FIG. 3H), erismodegib/sonidegib (FIG. 3I), fostamatinib (FIG. 3J), ixazomib (FIG. 3K), lapatinib (FIG. 3L), masitinib (FIG. 3M), oprozomib (FIG. 3N) in S1 cell and T4-2 cell; and ribociclib in T4-2 cell (FIG. 3O).
Figure 3:
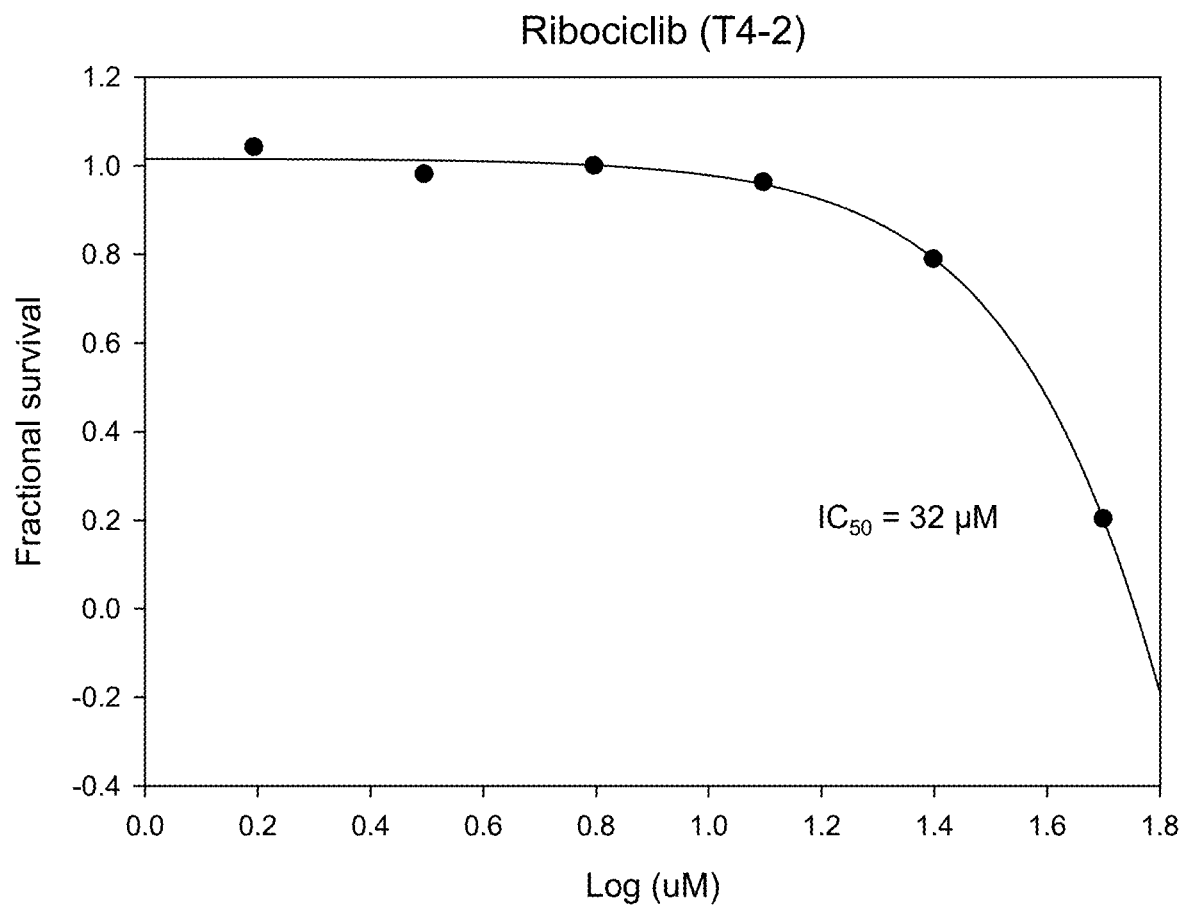
Figure 5:
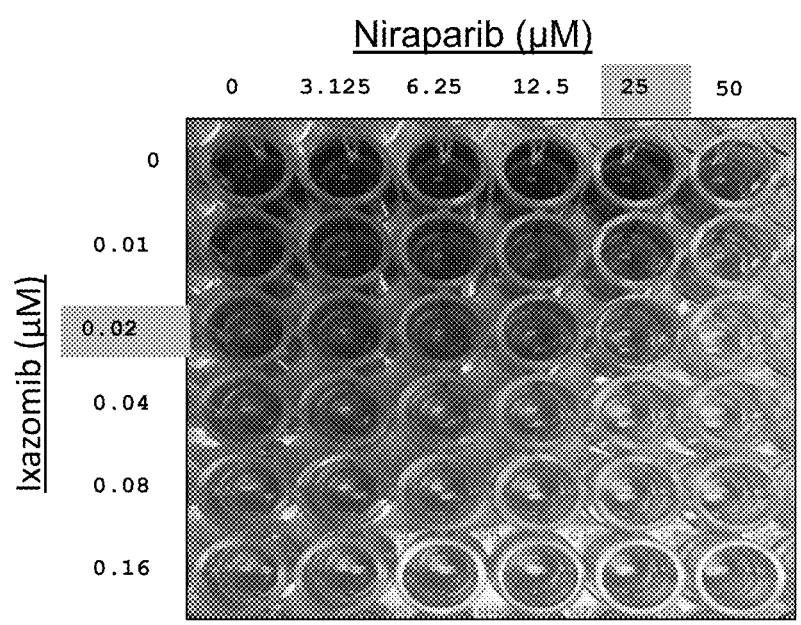
FIG. 5 is a table showing the results of the dose (FIG. 5B) for niraparib and ixazomib on 6×6 matrix 2D culture (FIG. 5A); the readout: cell survival.
Figure 6:
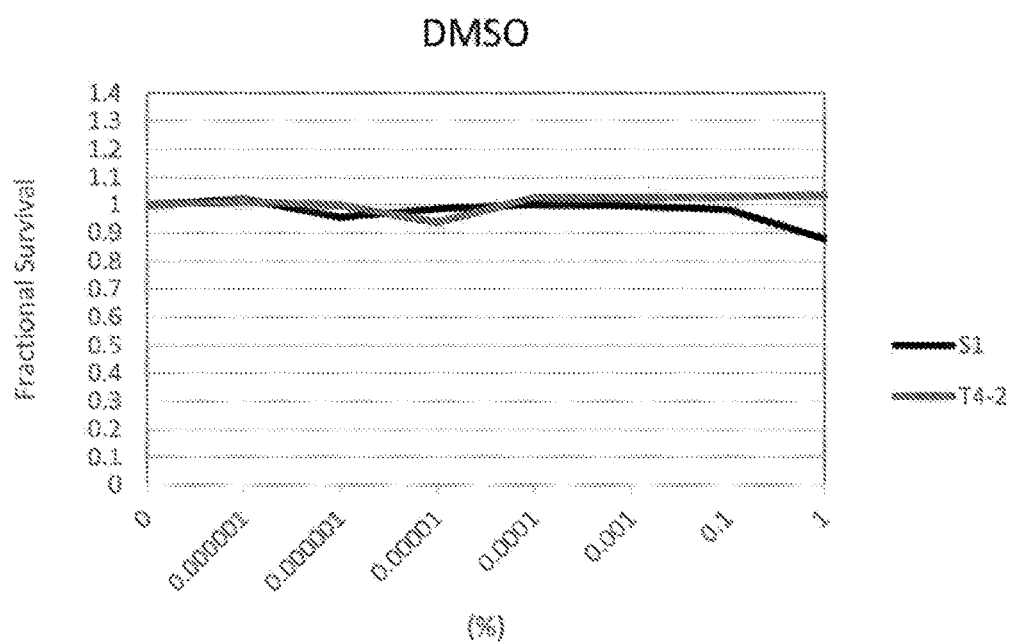
FIG. 6 is a graph showing the fractional survival of S1 and T4-2 cells treated with various concentrations (v/v) of DMSO.

To determine the half-maximal inhibitory concentration ($IC_{50}$) of the compounds in cell growth, HMT 3522 T4-2 human breast cancer cell lines were plated on a 96 multi-well plate with a density of $5\times10^3$ cells per well in H14 medium in 2D culture. Non-malignant S1 cells were used as a normal counterpart cell line to compare cell viability, and the cells plated with a density of $1\times10^4$ cells per well in H14 medium supplemented with epidermal growth factor (EGF). The S1 and T4-2 cells were grown for 18-20 hours prior to drug treatment and each drug was prepared for eight concentration ranges (0, 0.0001, 0.001, 0.01, 0.1, 1, 10, and 100 μM) by a serial dilution from a stock solution. The cells treated with drugs were cultured for 48 hours and followed by MTS colorimetric assay to access cell viability. The quantity of colored product of MTS measured at 490 nm is directly proportional to the number of living cells in the culture. The single-drug dose response curves are fitted with non-linear regression 4-parameter and $IC_{50}$ values were determined using SigmaPlot software (FIG. 3-5). DMSO (solvent) added to a serial dilution (up to 1%) showed minimal toxicity (FIG. 6).

To evaluate the dose response of combination-drug, relative viability in a 6×6 dose matrix was designed and the dose ranges were selected the ranges in-betweens $IC_{50}$ value of single-drug (FIG. 5). The compound combinations were tested on 2D culture for synergistic dosing; the combinations included bafetinib and entospletinib (FIG. 11A), lapatinib and enasidenib (FIG. 11B), derazantinib and bortezomib (FIG. 11C), bortezomib and enasidenib (FIG. 11D), roblitinib and oprozomib (FIG. 11E), bortezomib and abemaciclib (FIG. 11F), larotrectinib sulfate and masitinib (FIG. 11G), idelalisib and entospletinib (FIG. 11H), lapatinib and bortezomib (FIG. 11I), erismodegib and masitinib (FIG. 11J), acalabrutinib and fostamatinib (FIG. 11K), dabrafenib and ribociclib (FIG. 11L), duvelisib and fostamatinib (FIG. 11M), dabrafenib and derazantinib (FIG. 11N), ixazomib and niraparib (FIG. 11O), defactinib and entospletinib (FIG. 11P), lapatinib and enasidenib (FIG. 11Q), defactinib and idelalisib (FIG. 11R).

Figure 7:
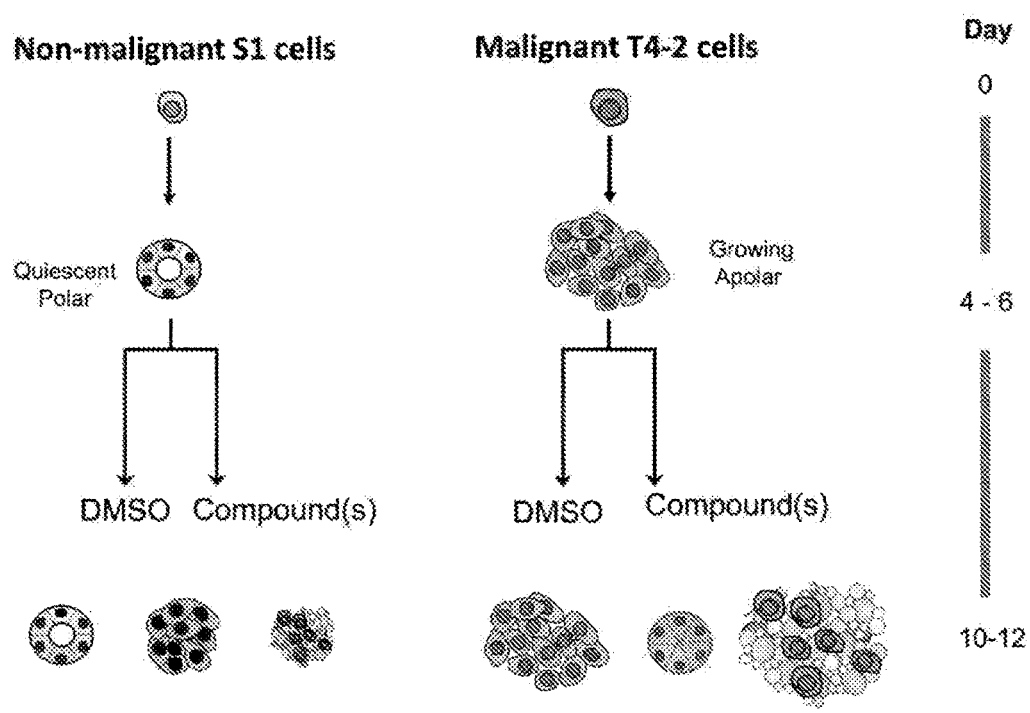
FIG. 7 is a diagram showing the process of translational assays in 3D LrECM culture.
Figure 8:
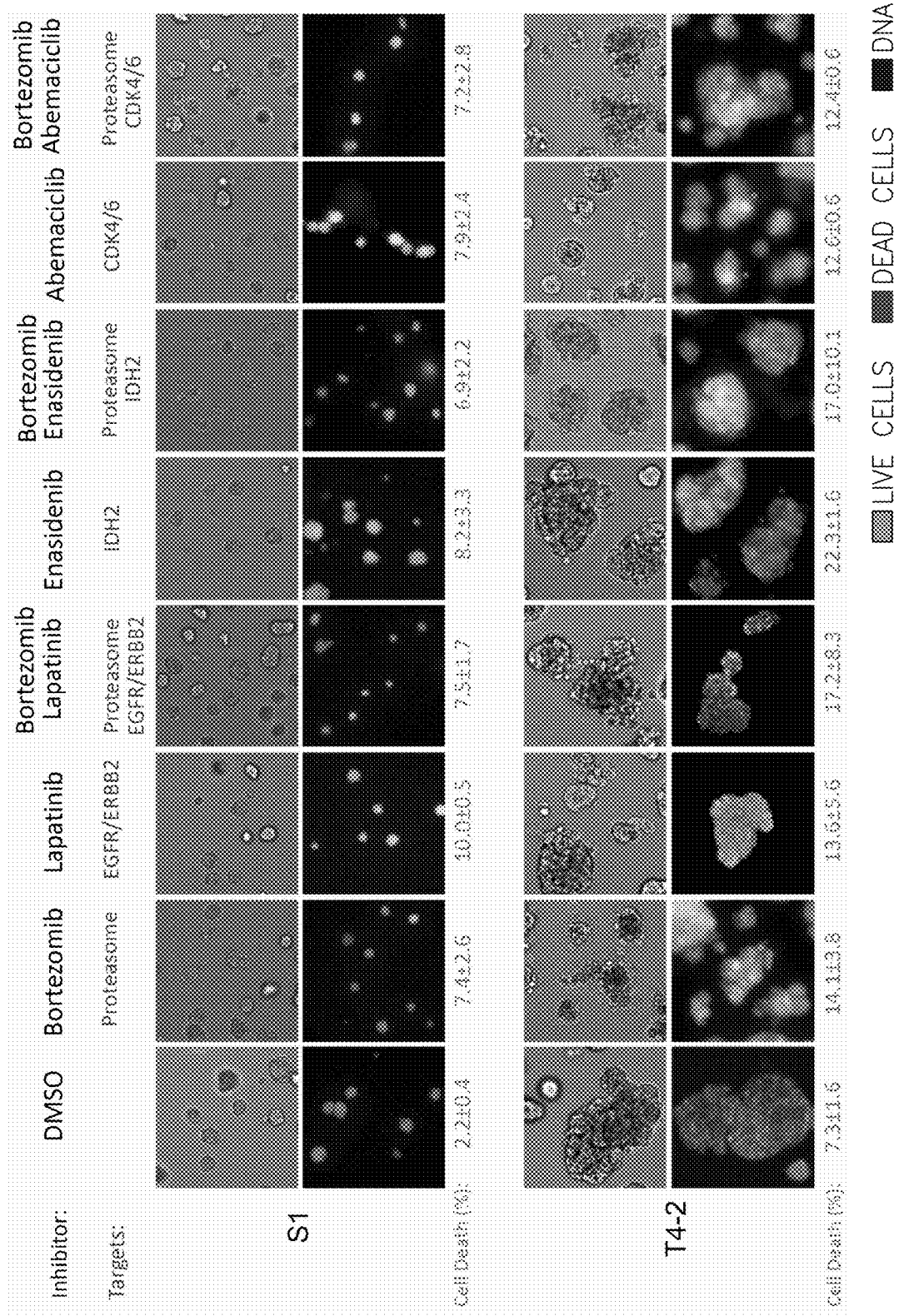
FIG. 8 is a set of images showing live cell, dead cell and DNA of S1 and T4-2 cells treated with different drugs and drug combinations.
Figure 8:
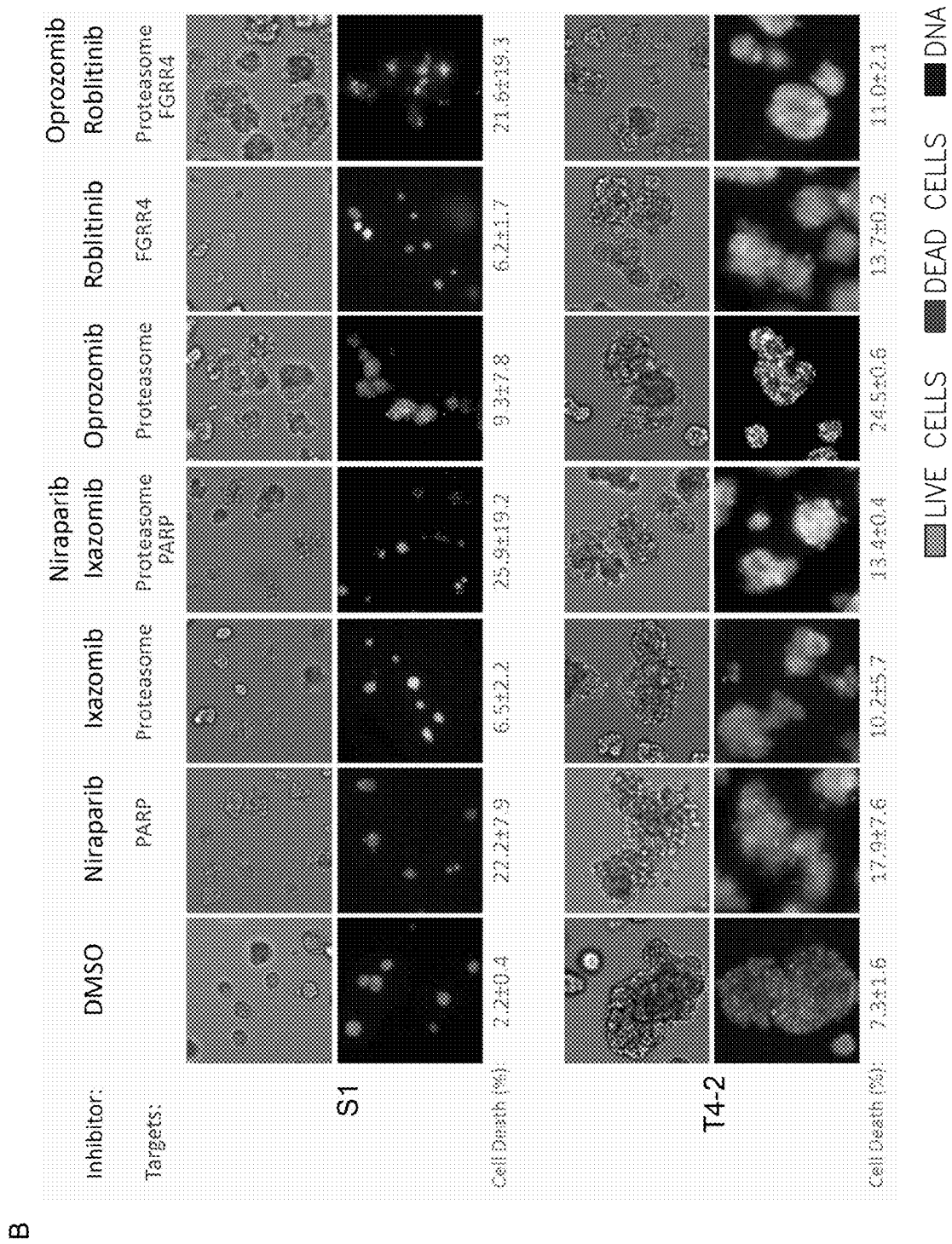
Figure 8:
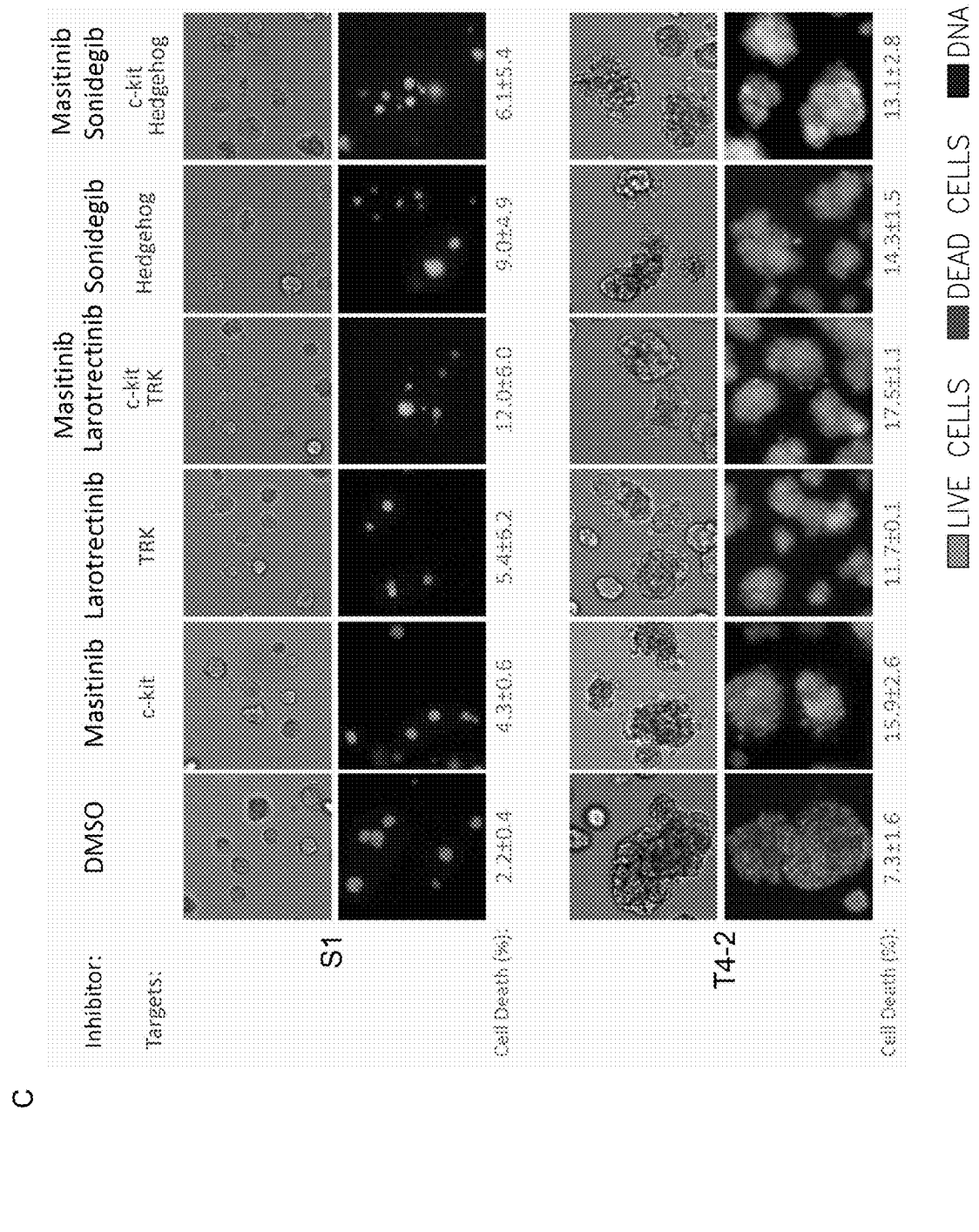
Figure 8:
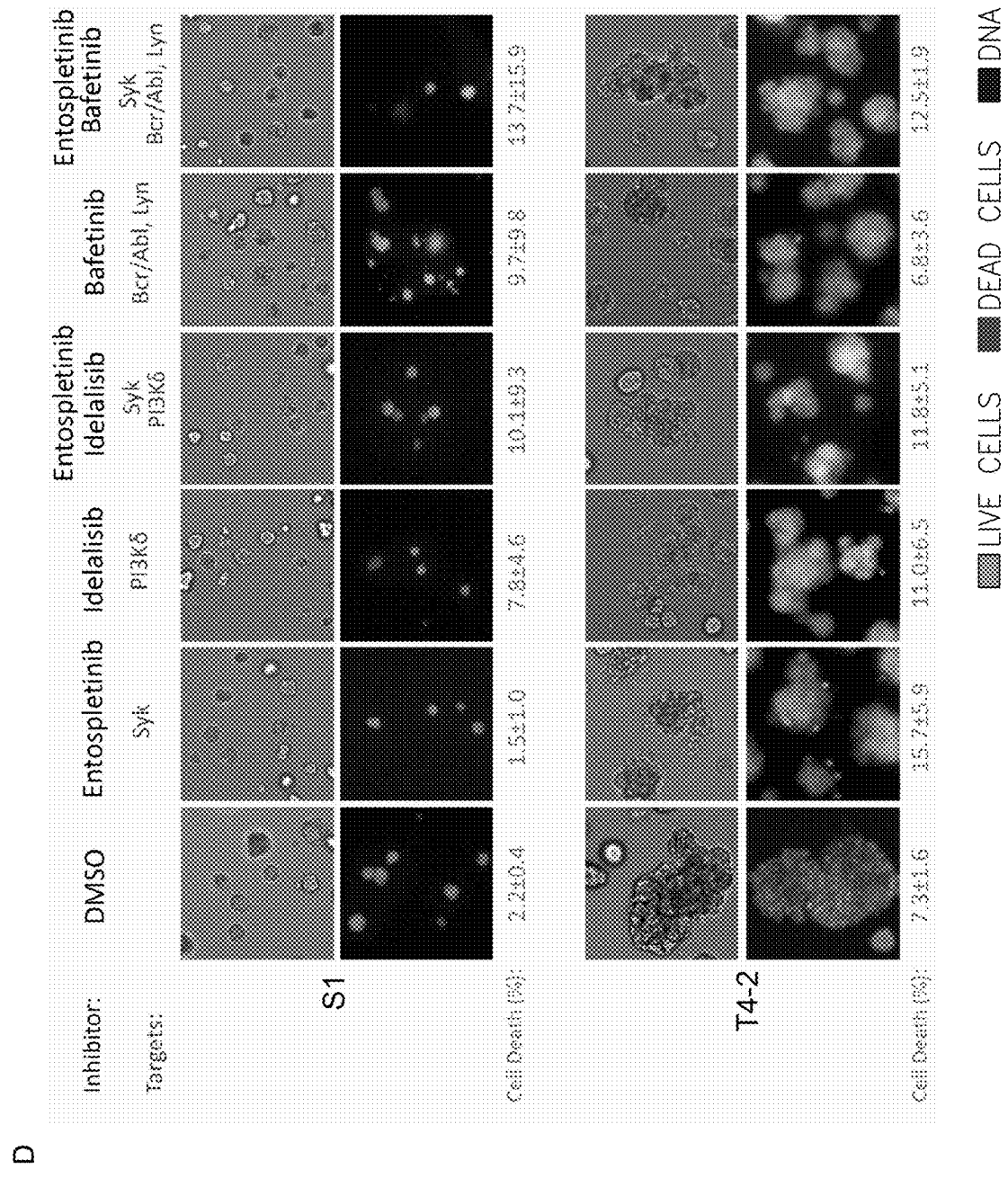
Figure 8:
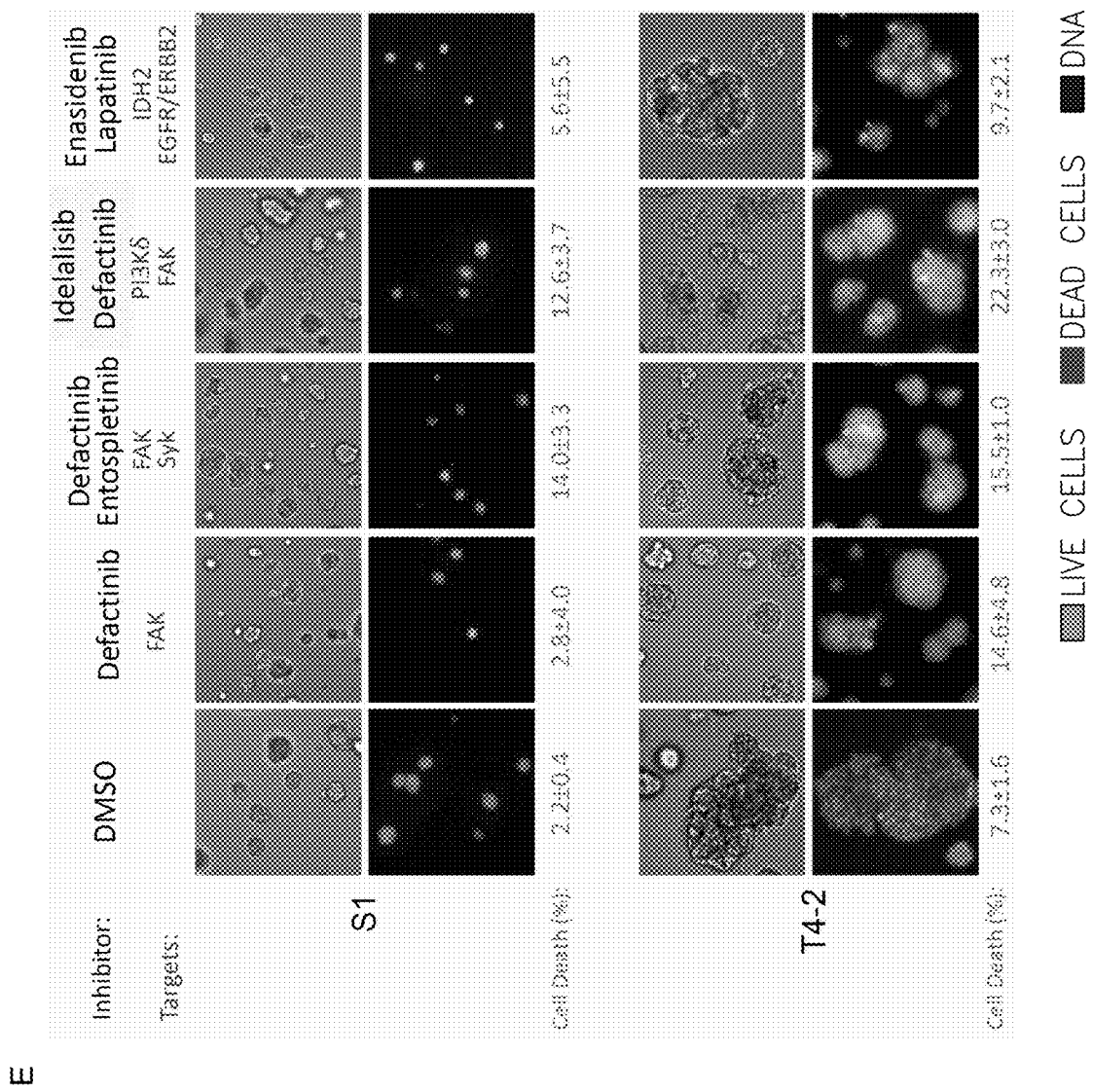
Figure 8:
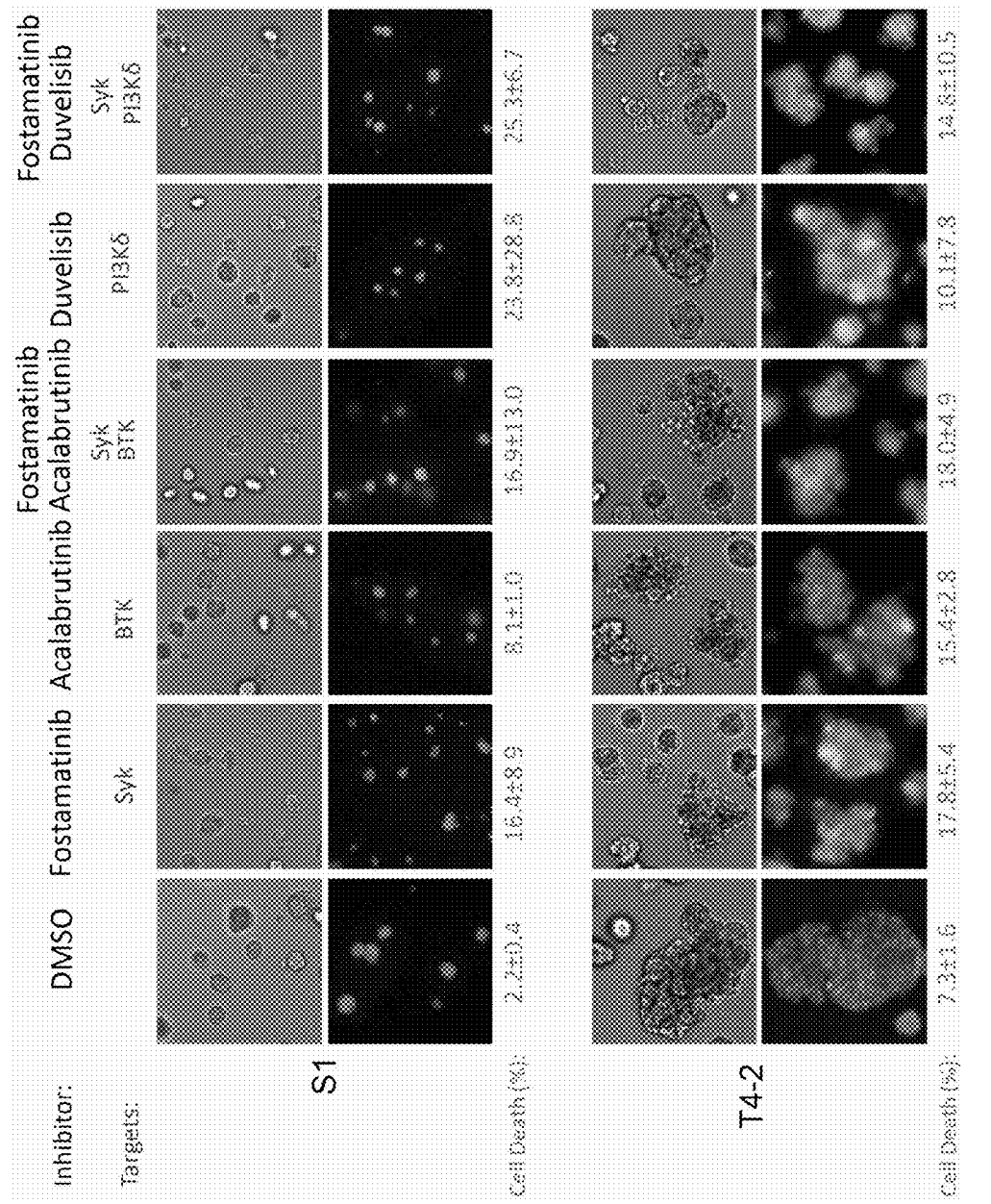
Figure 8:
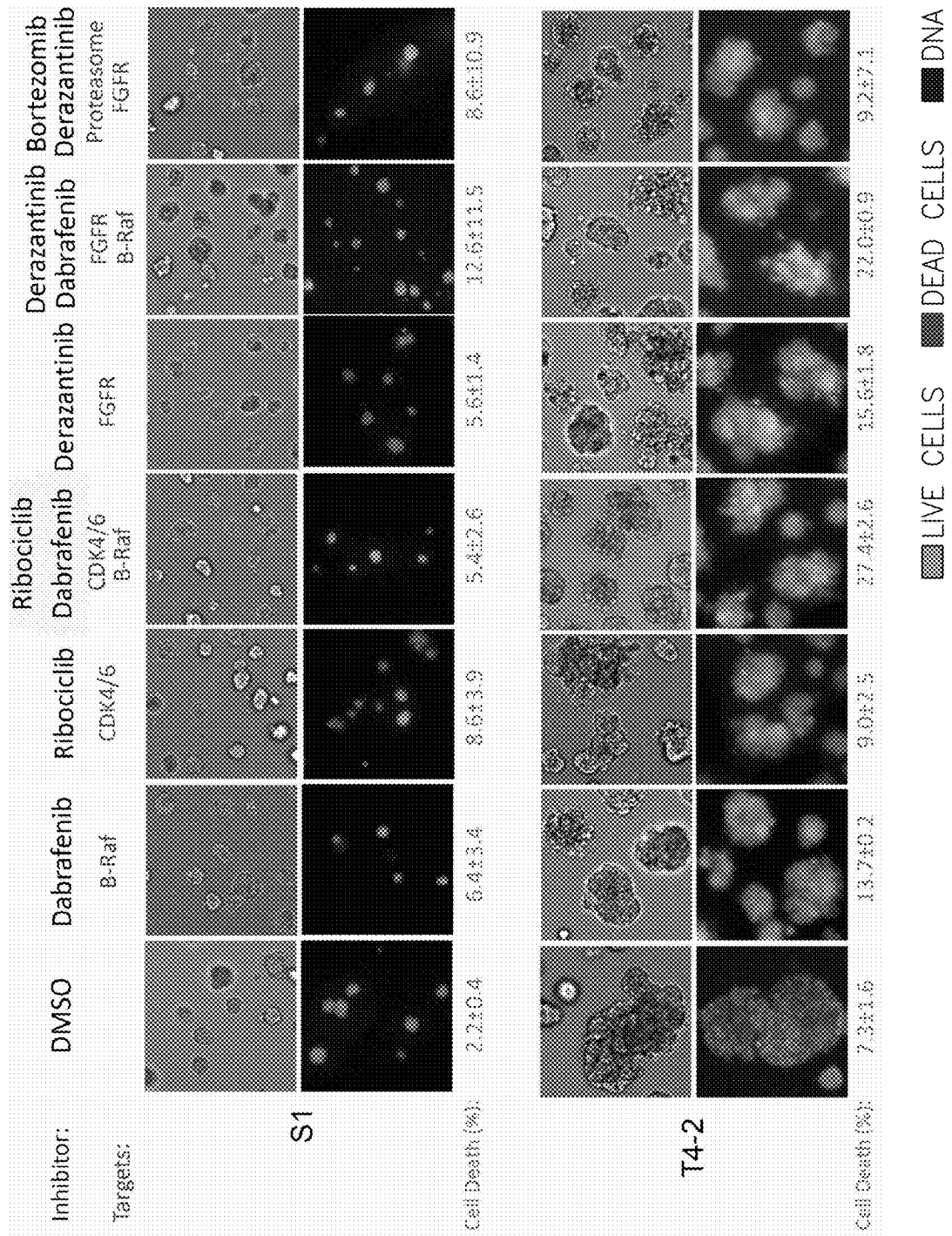
Figure 9:
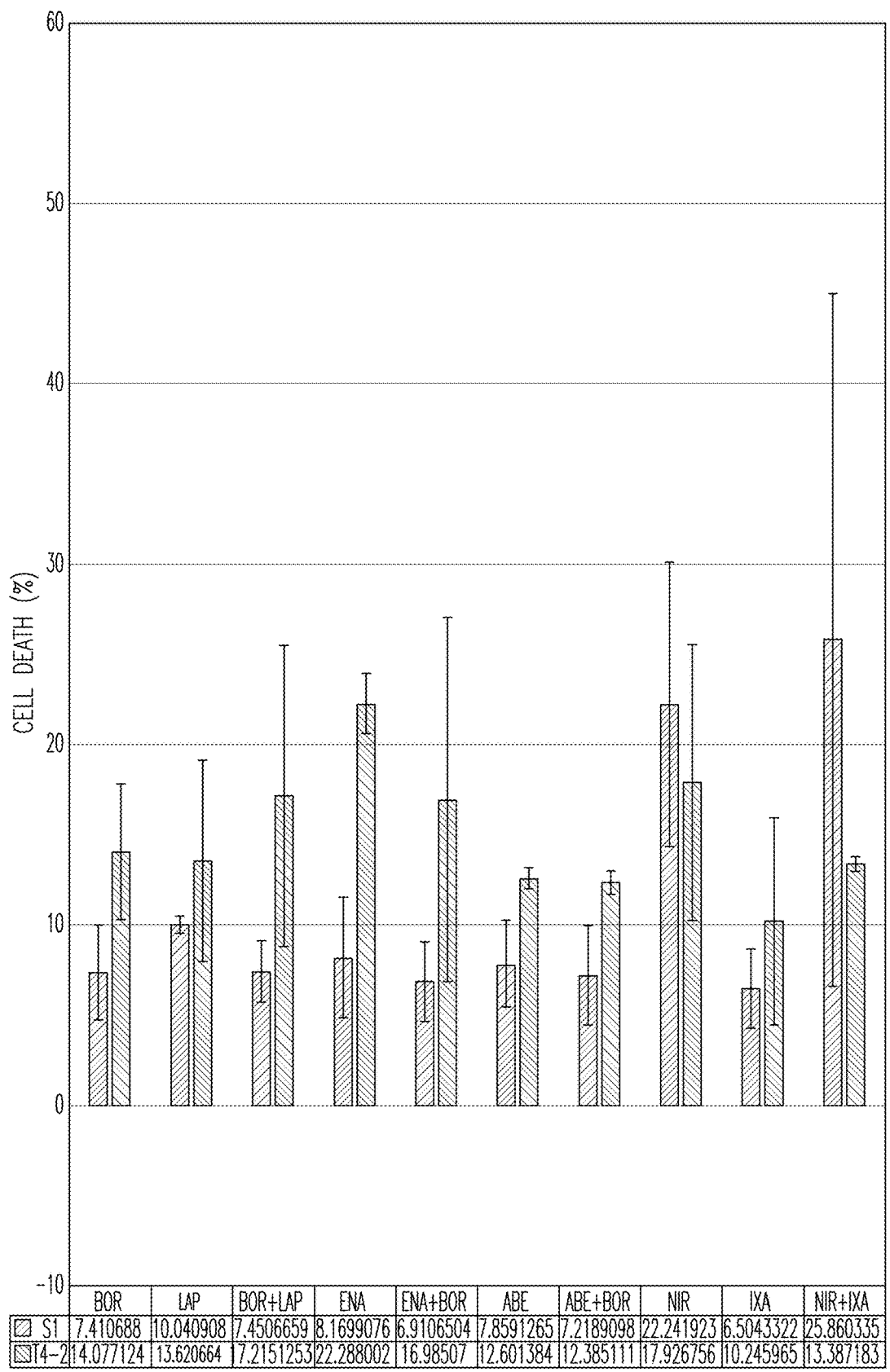
FIG. 9 is a histogram showing the percentage cell death of S1 and T4-2 cells treated with different drugs and drug combinations.
Figure 9:
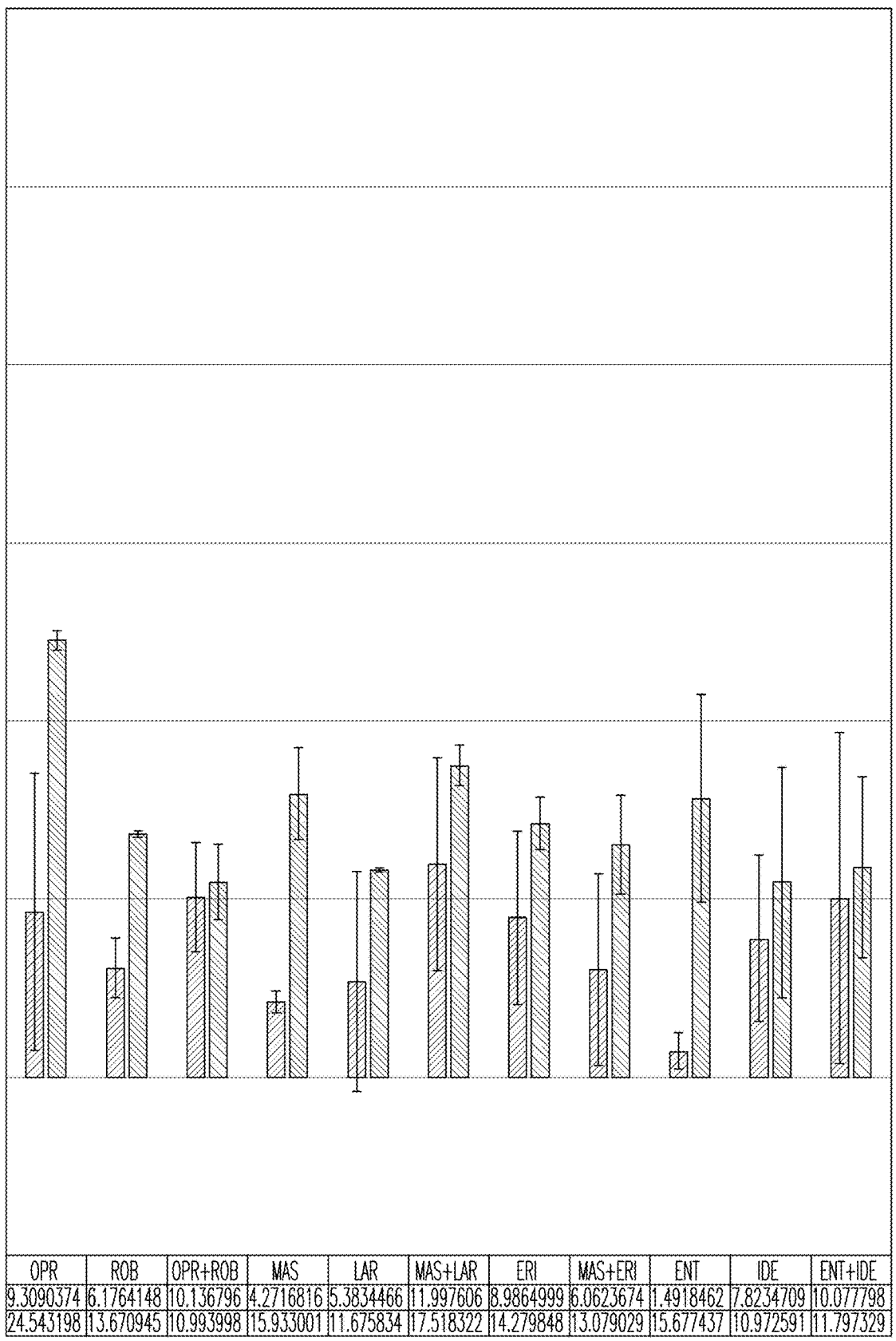
Figure 9:
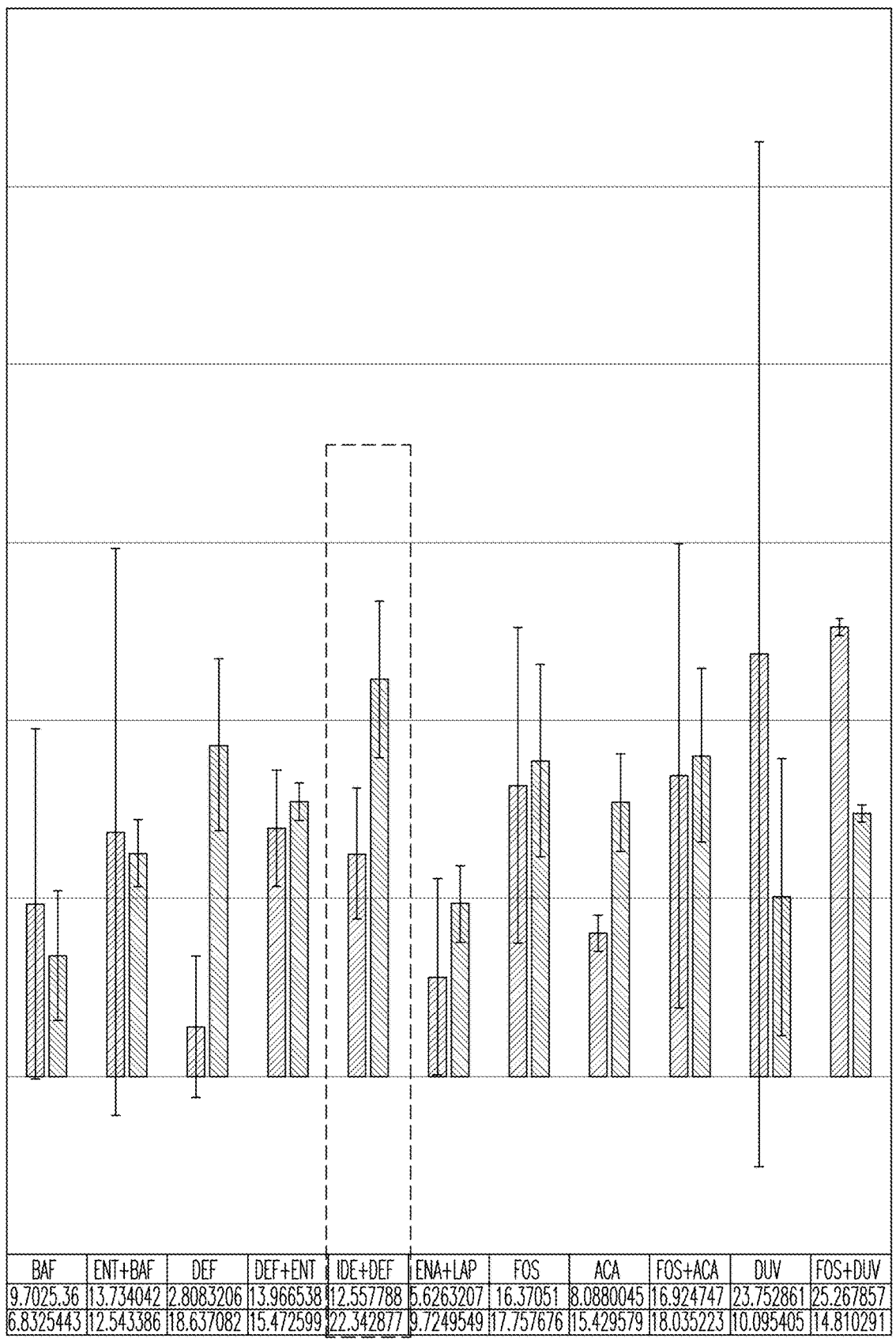
Figure 9:
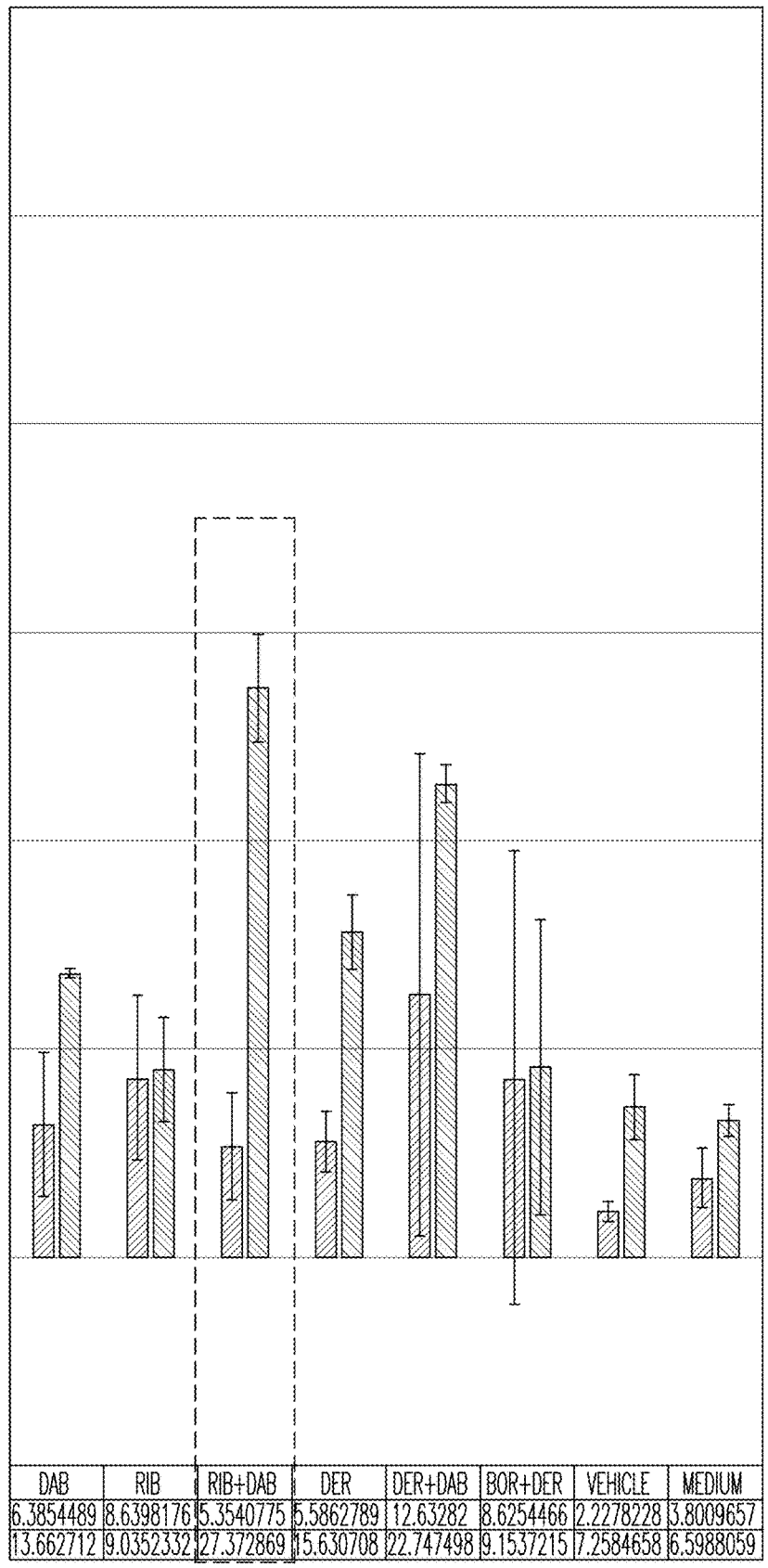

For 3D translational assay (FIG. 7), the concentrations that displayed synergistic inhibition behavior from the dose response of combination-drug obtained from 6×6 dose matrix were selected. Non-malignant S1 and Malignant T4-2 cells were evaluated for growth inhibition or cell death with the determined concentrations. The cells were plated at a density of $2×10^4$ (S1) or $1×10^4$ (T4-2) cells per well on top of Matrigel layer and allowed to form multicellular tumor colonies for 4-5 days. Then the cells were treated with either single-drug or drug combinations as PCI designed to evaluate synergistic interactions. Fresh media containing testing drugs were replenished every other day. At the end of the assay, we analyzed morphology and viability/cytotoxicity using phase imaging and fluorescent detection with Live/Dead using viability/cytotoxicity (Calcein AM/EthD-1) kit (FIG. 8). 3D translational assay in non-malignant S1 and malignant T4-2 cells were repeated 3 times. The results of FIG. 8 are summarized in the bar graph shown in FIG. 9.

The final data showed that ribociclib and dabrafenib and idelalisib and defactinib have significant synergistic interactions of compared to the either compound alone. Treatment of ribociclib with dabrafenib showed most effective apoptotic phenotype (FIG. 8G) among combinatorial treatments in malignant cells while non-malignant cells were unaffected. In addition, combined treatment of idelalisib and defactinib showed the significant cytotoxicity in malignant cells. However, about 10-15% of non-malignant cells were killed by this combination (FIG. 8E), possibly due to inhibition of FAK and PI3K that are important for normal mammary gland development and survival. Dose-adjustment may reduce the cytotoxicity in normal cells. Oprozomib promoted cell proliferation in non-malignant S1 cells (FIG. 8B). Combined treatment of oprozomib with roblitinib resulted in dell death in non-malignant S1 cells (FIG. 8B) Oprozomib alone or combined treatment with roblitinib could result in adverse side effect in vivo. Niraparib and ixazomib also showed significant cytotoxicity in malignant cells. These results are summarized in FIG. 10.

While the invention has been described in conjunction with the detailed description thereof, the foregoing description is intended to illustrate and not limit the scope of the invention, which is defined by the scope of the appended claims. Other aspects, advantages, and modifications are within the scope of the following claims.

The invention claimed is:

1. A pharmaceutical composition comprising a therapeutically effective amount of idelalisib and a therapeutically effective amount of defactinib, wherein the amounts are synergistically effective to treat triple negative breast cancer.

2. The pharmaceutical composition of claim 1, wherein the synergistically effective amounts provide for:
more than an additive effect of the combination compared to their individual effects; and/or
administration of at least one of the agents at a lower dosage than the dose of that agent that would be required to achieve the same therapeutic effect when the agent is administered as a monotherapy.

3. The pharmaceutical composition of claim 1, wherein the molar ratio of the idelalisib to the defactinib is between 2:1 and 4:1.

4. A method of treating cancer in a subject in need thereof, comprising administering to the subject a therapeutically effective amount of the pharmaceutical composition of claim 1, wherein the cancer is triple negative breast cancer.

5. The method of claim 4, wherein the triple negative breast cancer is basal-like breast cancer.

6. The method of claim 4, wherein the pharmaceutical composition is at least two times more effective at killing malignant cells than it is at killing non-malignant cells.

7. The method of claim 4, wherein the pharmaceutical composition is a pharmaceutical combination comprising the idelalisib and the defactinib as separate components of the combination, and wherein the administration of the idelalisib component and the defactinib component is simultaneous.

8. The method of claim 4, wherein the pharmaceutical composition is a pharmaceutical combination comprising the idelalisib and the defactinib as separate components of the combination, and wherein the administration of the idelalisib component and the defactinib component is sequential.

* * * * *